(12) United States Patent
Song et al.

(10) Patent No.: US 6,959,692 B2
(45) Date of Patent: Nov. 1, 2005

(54) COMPUTER CONTROLLED ENGINE VALVE OPERATION

(75) Inventors: Gang Song, Canton, MI (US); Ilya V. Kolmanovsky, Ypsilanti, MI (US); John Ottavio Michelini, Sterling Heights, MI (US); Alexander O'Connor Gibson, Ann Arbor, MI (US); Larry Allen Hardy, Riverview, MI (US); Michael John Cullen, Northville, MI (US); Xiaoying Zhang, Dearborn Hts., MI (US); Mrdjan J. Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 10/413,876

(22) Filed: Apr. 15, 2003

(65) Prior Publication Data

US 2004/0206317 A1 Oct. 21, 2004

(51) Int. Cl.$^7$ ............................................... F02P 5/145
(52) U.S. Cl. ............................. 123/406.45; 123/406.48; 123/406.47; 123/90.15; 123/698; 123/534
(58) Field of Search ........................ 123/90.15–90.18, 123/534, 698, 699, 406.45, 406.48, 406.47

(56) References Cited

U.S. PATENT DOCUMENTS

| | | | |
|---|---|---|---|
| 4,848,281 A | * | 7/1989 | McCord ................. 123/184.58 |
| 5,495,830 A | * | 3/1996 | Wu ........................ 123/90.15 |
| 6,321,732 B1 | | 11/2001 | Kotwicki et al. ...... 123/568.16 |
| 6,386,156 B1 | | 5/2002 | Stockhausen et al. |
| 6,401,677 B1 | * | 6/2002 | Rohe et al. ............... 123/90.16 |
| 6,412,458 B2 | | 7/2002 | Kawasaki |
| 6,431,130 B1 | | 8/2002 | Leone et al. |
| 6,470,853 B1 | | 10/2002 | Leone et al. |
| 6,474,303 B1 | | 11/2002 | Leone et al. |
| 6,484,677 B2 | | 11/2002 | Leone et al. |
| 6,711,489 B2 | * | 3/2004 | Haskara et al. ........ 123/568.14 |
| 2002/0129800 A1 | | 9/2002 | Russell et al. ......... 123/568.16 |
| 2003/0070659 A1 | * | 4/2003 | Kihara et al. ................ 123/470 |

FOREIGN PATENT DOCUMENTS

| JP | A-05-099030 | 4/1993 |
|---|---|---|
| JP | A-2002-180869 | 6/2002 |

* cited by examiner

*Primary Examiner*—Erick Solis
(74) *Attorney, Agent, or Firm*—Allan J. Lippa; Alleman Hall McCoy Russell & Tuttle LLP

(57) ABSTRACT

An electronic valve actuation system and control method is described. The valve timing is changed between early and late intake valve closing depending on engine operating conditions. Further, valve timing is adjusted to control engine airflow or engine torque. Finally, air-fuel ratio is adjusted based on feedback from an exhaust gas oxygen sensor as well as an estimate of air, fuel, and residual exhausted from cylinders operating with late valve closing (after bottom dead center) timing.

27 Claims, 18 Drawing Sheets

AIR-TO-FUEL RATIO DISTURBANCE IN EIVC/LIVC CHARGE DELIVERY MODE TRANSITIONS, CONDITIONS: CONSTANT INJECTOR PW, SAME STEADY-STATE AIRFLOW BEFORE AND AFTER TRANSITIONS.

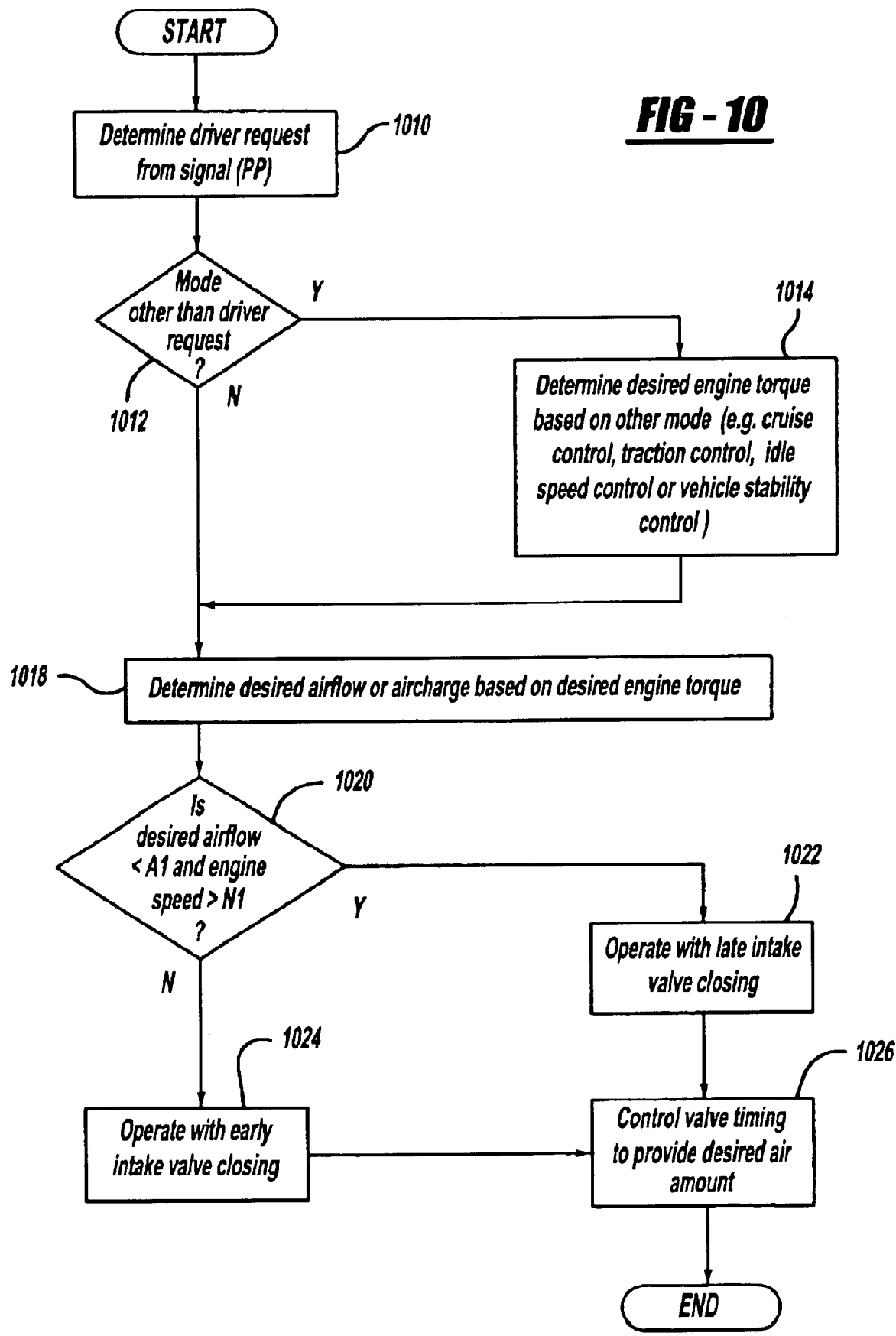

COMPUTER CONTROLLED ENGINE VALVE OPERATION

BACKGROUND OF THE INVENTION

Engines of vehicles can operate with an emission control device to reduce exhaust emissions. In order to achieve efficient conversion of exhaust emissions, emission control devices such as catalytic converters require specific exhaust air-fuel ratios. Thus, fuel injection is typically controlled in order to provide a desired exhaust air-fuel ratio and thereby improve emission reduction.

However, the inventors herein have recognize a disadvantage with systems that transition valve timing between early intake valve closing (EIVC) and late intake valve closing (with valve closing past BDC (bottom dead center) (i.e., in the compression stroke). In particular, the transition between early intake valve closing (EIVC) operation and late intake valve closing (LIVC) operation can be difficult to manage.

For example, when the air-fuel charge starts to be pushed back into the intake manifold from the cylinder in late valve timing (due to compression from piston motion), the air-to-fuel mixture supplied to the subsequent cylinders is disturbed. This is because the air-fuel mixture is pushed back into the intake manifold. Deviations in the exhaust air-fuel ratio occur as a result and there can be a degraded impact on catalyst performance and tailpipe emissions. In other words, the air-fuel mixture pushed back into the intake manifold changes the air-fuel mixture to be drawn into subsequent cylinder events.

SUMMARY OF THE INVENTION

The above disadvantages are overcome by an electronically controlled system. The system comprises: a computer storage medium having a computer program encoded therein for controlling fuel injected into an internal combustion engine having an intake manifold, said computer storage medium comprising: code for determining an amount of a medium exhausted into said intake manifold from a previous cylinder event of said engine; and code for adjusting fuel injected for a later cylinder event based on said determined amount of medium.

In this way, it is possible to transition between early and late intake valve timing while reducing exhaust air-fuel ratio errors during the transition. In other words, by determining medium that is exhausted into the intake manifold, it is possible to provide future cylinders with a more accurate amount of injected fuel, thereby more accurately maintaining the overall exhaust gas air-fuel ratio.

Furthermore, in another aspect of the invention, which determines when to transition between early and late intake valve closing, it is possible to provide a requested amount of engine output, or engine airflow.

BRIEF DESCRIPTION OF THE FIGURES

The above features, and advantages will be readily apparent from the following detailed description of an example embodiment of the invention when taken in connection with the accompanying drawings.

FIGS. 5–6 and 10 are high level flowcharts for use with the present invention;

DETAILED DESCRIPTION OF THE INVENTION

Figure 1:
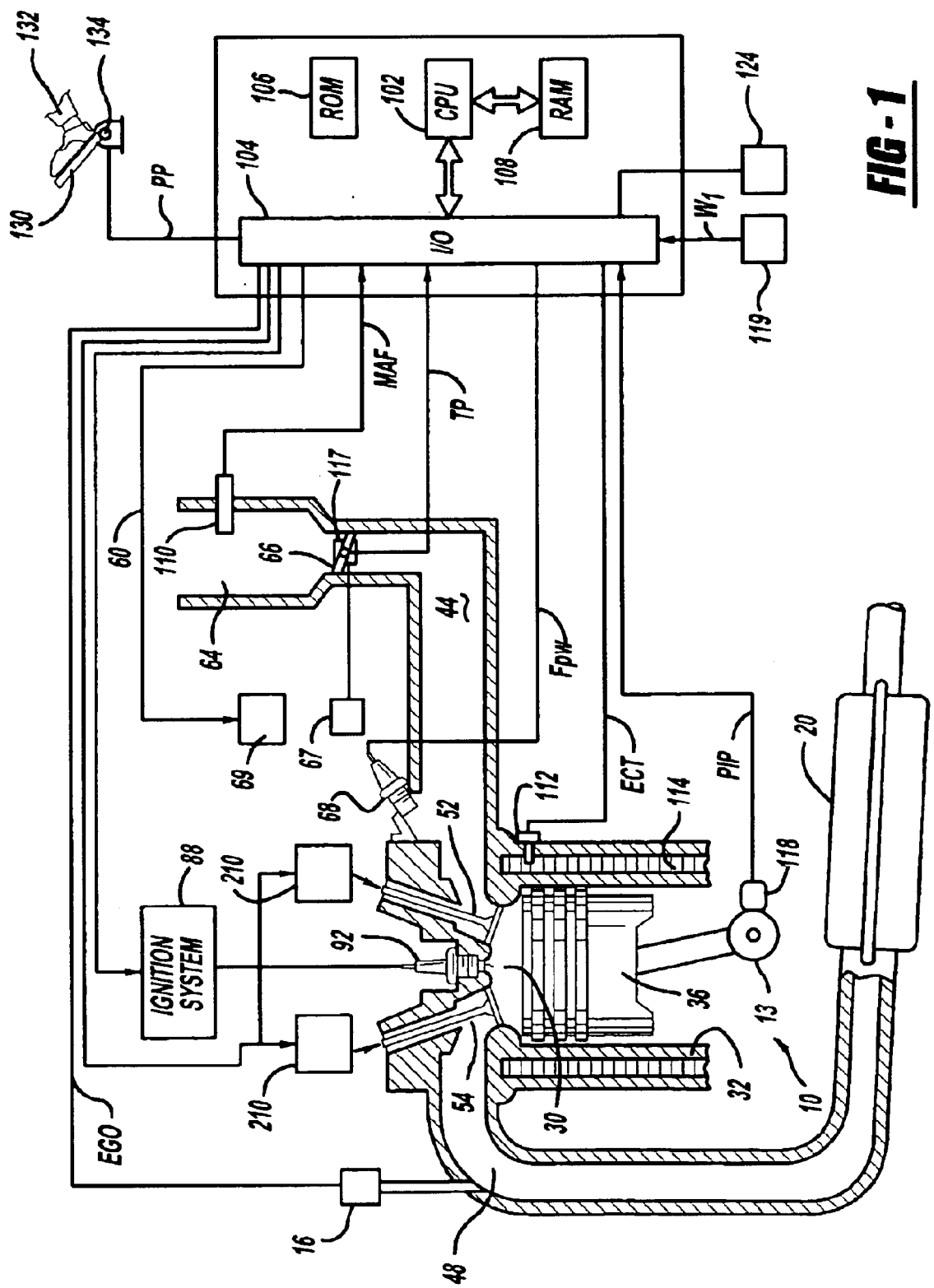
FIG. 1 is a block diagram of a vehicle illustrating various components related to the present invention.

Referring to FIG. 1, internal combustion engine 10 is shown. Engine 10 is an engine of a passenger vehicle or truck driven on roads by drivers. Engine 10 is coupled to torque converter via crankshaft 13. The torque converter is also coupled to transmission via turbine shaft. The torque converter has a bypass clutch, which can be engaged, disengaged, or partially engaged. When the clutch is either disengaged or partially engaged, the torque converter is said to be in an unlocked state. The turbine shaft is also known as transmission input shaft. The transmission comprises an electronically controlled transmission with a plurality of selectable discrete gear ratios. The transmission also comprises various other gears such as, for example, a final drive ratio. The transmission is also coupled to tires via an axle. The tires interface the vehicle to the road.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In one example, converter 20 is a three-way catalyst for converting emissions during operation about stoichiometry.

As described more fully below with regard to FIGS. 2a and 2b, at least one of, and potentially both, of valves 52 and 54 are controlled electronically via apparatus 210.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. In an alternative embodiment, no throttle is utilized and airflow is controlled solely using valves 52 and 54. Further, when throttle 66 is included, it can be used to reduce airflow if valves 52 or 54 become degraded.

Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (N). Alternatively, turbine speed may be determined from vehicle speed and gear ratio.

Continuing with FIG. 1, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Figure 2:
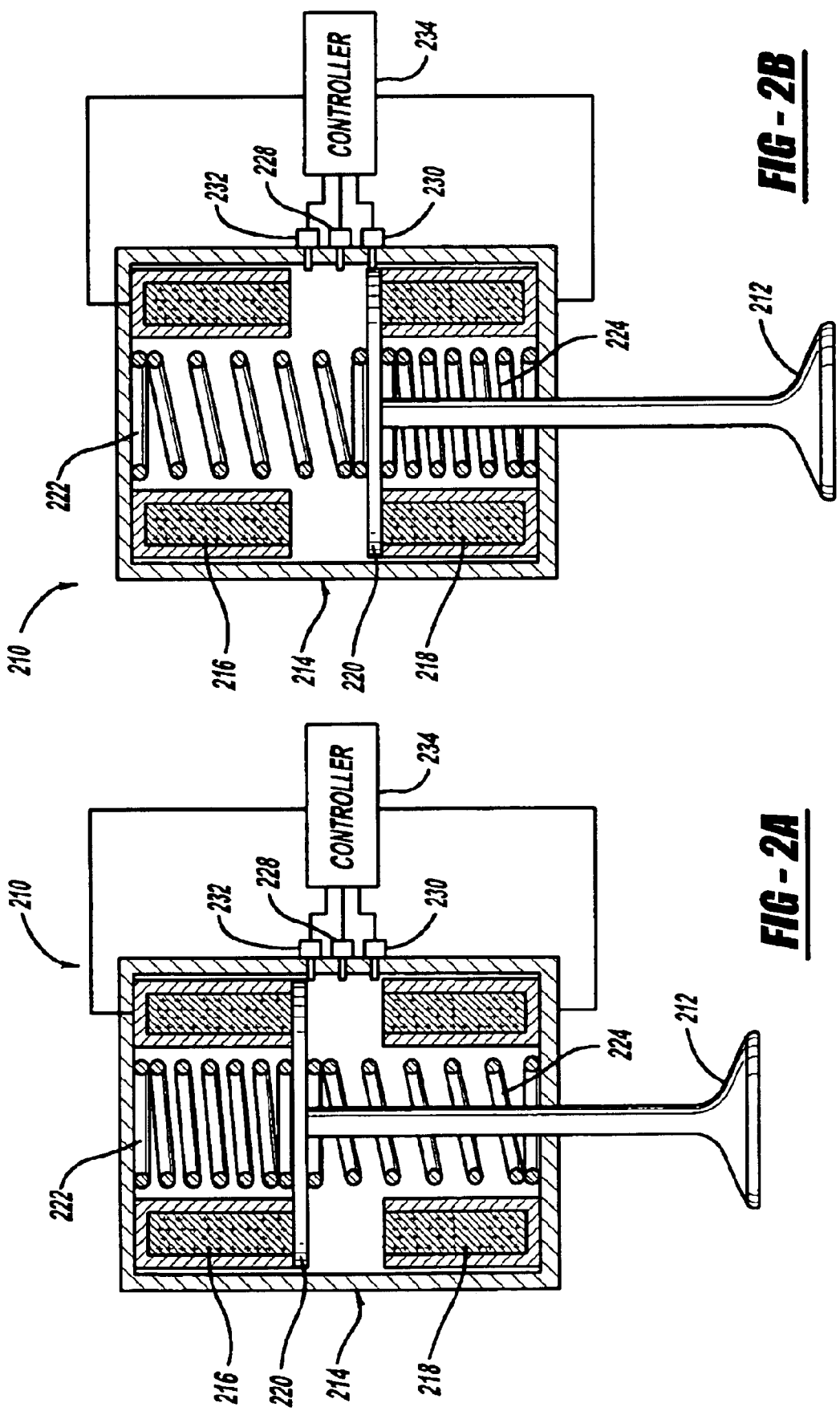
FIG. 2a show a schematic vertical cross-sectional view of an apparatus for controlling valve actuation, with the valve in the fully closed position.
FIG. 2b shows a schematic vertical cross-sectional view of an apparatus for controlling valve actuation as shown in FIG. 1, with the valve in the fully open position.

Referring to FIGS. 2a and 2b, an apparatus 210 is shown for controlling movement of a valve 212 in camless engine 10 between a fully closed position (shown in FIG. 2a), and a fully open position (shown in FIG. 2b). The apparatus 210 includes an electromagnetic valve actuator (EVA) 214 with upper and lower coils 216, 218 which electromagnetically drive an armature 220 against the force of upper and lower springs 222, 224 for controlling movement of the valve 212.

Switch-type position sensors 228, 230, and 232 are provided and installed so that they switch when the armature 220 crosses the sensor location. It is anticipated that switch-type position sensors can be easily manufactured based on optical technology (e.g., LEDs and photo elements) and when combined with appropriate asynchronous circuitry they would yield a signal with the rising edge when the armature crosses the sensor location. It is furthermore anticipated that these sensors would result in cost reduction as compared to continuous position sensors, and would be reliable.

Controller 234 (which can be combined into controller 12, or act as a separate controller) is operatively connected to the position sensors 228, 230, and 232, and to the upper and lower coils 216, 218 in order to control actuation and landing of the valve 212.

The first position sensor 228 is located around the middle position between the coils 216, 218, the second sensor 230 is located close to the lower coil 218, and the third sensor 232 is located close to the upper coil 216.

As described above, engine 10, in one example, has an electro-mechanical valve actuation (EVA) with the potential to maximize torque over a broad range of engine speeds and substantially improve fuel efficiency. The increased fuel efficiency benefits are achieved by eliminating the throttle, and its associated pumping losses, (or operating with the throttle substantially open) and by controlling the engine operating mode and/or displacement, through the direct control of the valve timing, duration, and or lift, on an event-by-event basis.

In one aspect of the invention, unlike throttle based torque control, intake valve closing (IVC) timing is adjusted to achieve the desired engine torque output. If the torque demand is low, the engine demand for air is also low and IVC timing is adjusted to force the intake valve to close earlier. The inventors of the subject application have recognized that at high engine speed and low torque demand conditions, the time available for opening and closing the intake valve as desired to deliver the demanded air charge may become excessively small so that the actuators (that have a finite speed of response) can no longer provide it.

Figure 3:
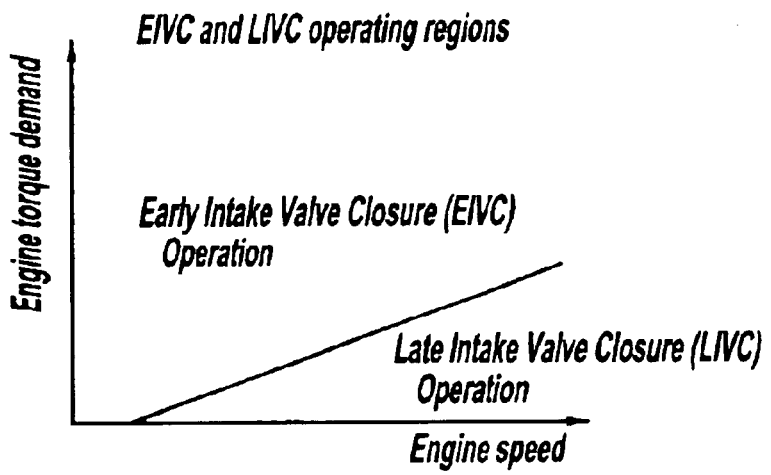
FIG. 3 is a graph illustration an example of selection criteria for valve closing timing.

At these conditions wherein air charge control can be degraded with early intake valve closing (EIVC), late intake valve closing strategy (with valve closing past BDC (bottom dead center) in the compression stroke) is employed. In the late intake valve closing (LIVC) mode, more charge is drawn in than needed and then the excess is pushed back into the intake manifold by upward piston motion. An example of how the valve closing mode selection is accomplished is shown by the graph illustrated in FIG. 3. Further, a routine for controlling valve timing is described below with regard to FIG. 10 in order to overcome this disadvantage.

The inventors herein have further recognized a disadvantage when transitioning between these two modes. Thus, the transition between early intake valve closing (EIVC) operation and late intake valve closing (LIVC) operation as may be required as a result of the driver torque demand drop at high engine speeds can be difficult to manage. This difficulty is now described in detail below.

When the air-fuel charge starts to be pushed back into the intake manifold from the cylinder, the air-to-fuel mixture supplied to the subsequent cylinders is disturbed. Deviations in the exhaust air-fuel ratio occur as a result and there can be a degraded impact on catalyst performance and tailpipe emissions. In other words, the air-fuel mixture pushed back into the intake manifold changes the air-fuel mixture to be drawn into future cylinder events. This effect is illustrated in FIG. 4.

Figure 4:
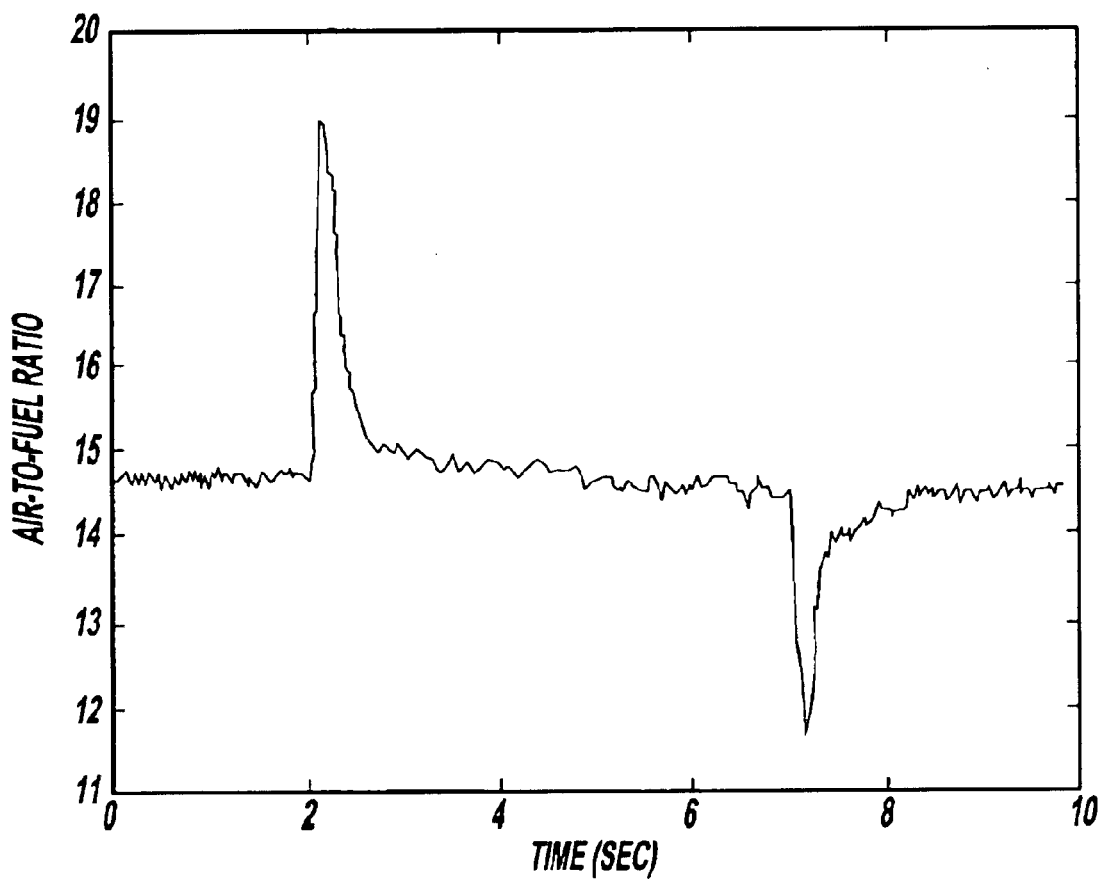
FIG. 4 shows measured air-to-fuel ratio spikes caused by EIVC to LIVC transitions at 2500 rpm.

Specifically, FIG. 4 demonstrates the transient deviations in the measured exhaust air-to-fuel ratio caused by transitions between EIVC and LIVC modes where in both modes the airflow and the injected fueling rate remains the substantially constant.

Figure 5:
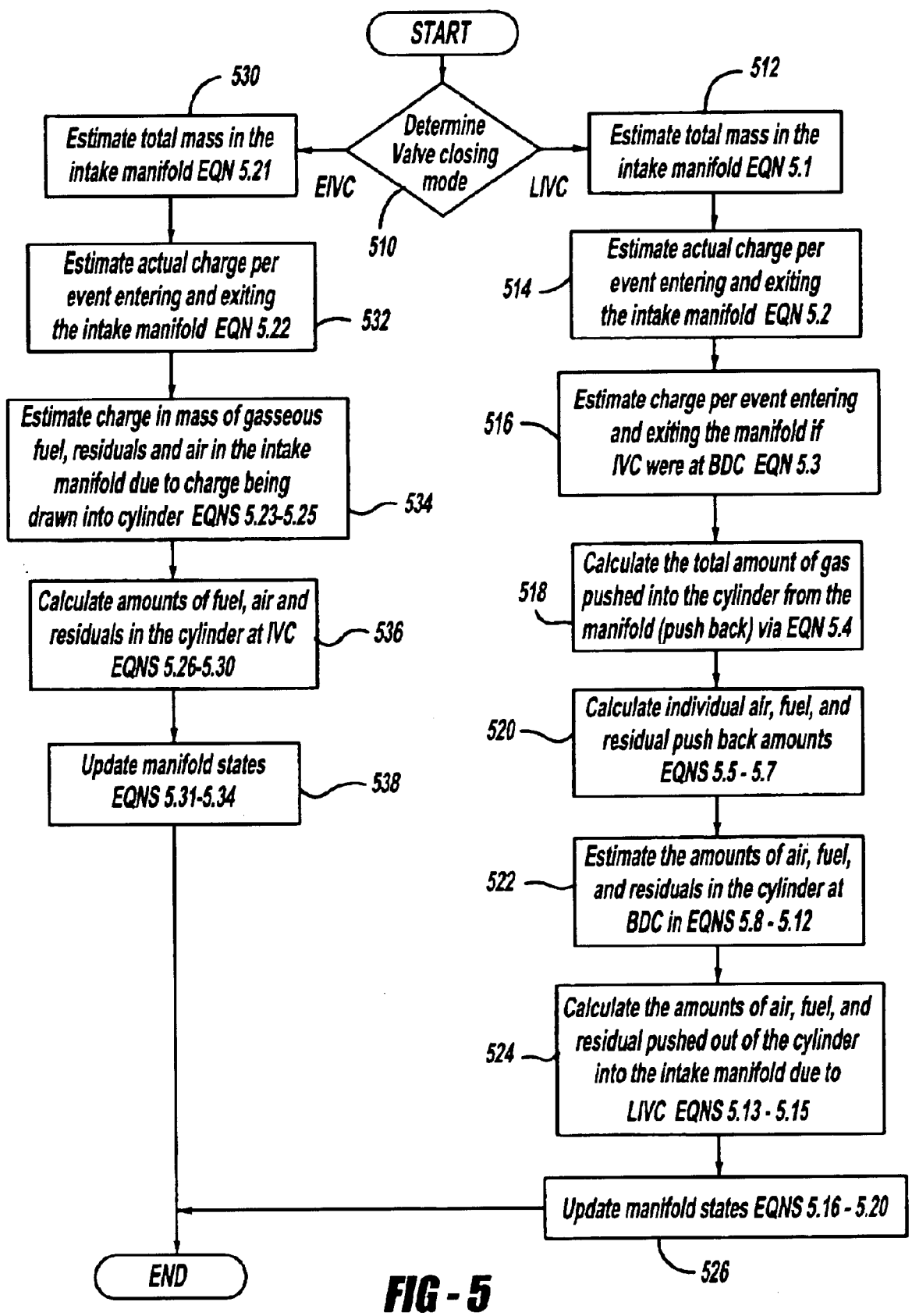

FIG. 5 first describes an algorithm that estimates the effect of fuel and residual pushback during LIVC mode. Generally, the algorithm keeps track of the gaseous fuel and residuals mass in the intake manifold and updates them as a result of pushback. Once the estimator for the pushback fuel and residuals mass is developed, a controller that provides transient compensation to minimize deviations in the air-to-fuel ratio from the desired value during the transition is specified in FIG. 6. Additionally, the estimated ratio of residuals to air in-cylinder is used to correctly estimate MBT spark and engine torque as required to ensure vehicle drivability and fuel efficient operation.

The estimation algorithm of FIG. 5 updates the mass of gaseous fuel, residual gas, air and the mass of liquid fuel puddle on event-to-event basis. The following notation is used for these variables:

| | |
|---|---|
| $m_{f,Man}(k)$ | mass (kg) of (pushed back gaseous) fuel in intake manifold at event k |
| $m_{r,Man}(k)$ | mass (kg) of residual gas in intake manifold at event k |
| $m_{a,Man}(k)$ | mass (kg) of air in intake manifold at event k |
| $m_p(k)$ | mass (kg) of fuel puddle in intake manifold at event k |

The input variables to the algorithm are:

$W_{cyl}(k)$ flow rate of air (kg/sec) estimated by EVA engine charge estimation function as a function of present valve timings and other engine operating parameters;

$N(k)$ engine speed (measured);

$W_{cyl,BDC}(k)$ flow rate of air (kg/sec) estimated by EVA engine charge estimation function if intake valve closure (IVC) were at Bottom Dead Center (BDC). This may be also considered as a calibratable correction function.

$W_{f,i}(k)$ injector fueling rate (kg/sec);

$X(k),\tau(k)$ wall-wetting fraction and time constant estimated by transient fuel function as a function of present engine operating conditions (engine speed, intake temperature, intake pressure). Transient fuel refers to an estimate of an amount of fuel injected into the intake manifold but not inducted into the engine during a previous injection event, due to its retention in the intake manifold, usually in a puddle in the intake manifold);

$m_{f,cvp}(k)$ mass of fuel (kg) entering the cylinder due to fuel purge, estimated by fuel purge function;

$m_r^{nom}(k)$ nominal mass of residuals per cylinder (kg) that is due to overlap and exhaust valve closure timing, predicted on the basis of a nominal model.

Referring now to FIG. 5, an example of the estimation algorithm is described. First, a determination is made in step 510 as to whether the current operating mode is EIVC or LIVC. If the answer to step 510 is that the current mode is LIVC, then the following calculations and determinations are performed for Late Intake Valve Closure (LIVC) Charge Delivery Mode, starting with step 512. First, in step 512, the routine estimates total mass in intake manifold according to equation 5.1.

$$m_{Man}(k) = m_{a,Man}(k) + m_{r,Man}(k) + m_{f,Man}(k) \quad \text{Eqn. 5.1}$$

Then, in step 514, the routine estimates, via equation 5.2 actual charge per event entering and exiting the intake manifold, given the current estimate of the cylinder flow.

$$C_{Cyl}(k) = W_{cyl}(k) \cdot \frac{30}{N}. \quad \text{Eqn. 5.2}$$

Next, in step 516, the routine estimates, via equation 5.3, charge per event entering and exiting the intake manifold if IVC were at BDC, given the estimate of cylinder flow at BDC.

$$C_{Cyl,BDC}(k) = W_{cyl,BDC}(k) \cdot \frac{30}{N} \quad \text{Eqn. 5.3}$$

Next, in step 518, the routine calculates total push-back charge mass in equation 5.4.

$$C_{pb}(k) = C_{Cyl,BDC}(k) - C_{Cyl}(k) \quad \text{Eqn. 5.4}$$

Then, in step 520, the routine estimate the amounts of "pushed-back" (gaseous) fuel, "pushed-back" residuals and air that enters the cylinders at BDC from intake manifold in Eqns. 5.5–5.7.

$$\begin{cases} \Delta m_{f,Man,BDC}(k) = C_{cyl,BDC}(k) \dfrac{m_{f,Man}(k)}{m_{Man}(k)} \\ \Delta m_{r,Man,BDC}(k) = C_{cyl,BDC}(k) \dfrac{m_{r,Man}(k)}{m_{Man}(k)} \\ \Delta m_{a,Man,BDC}(k) = C_{cyl,BDC}(k) \dfrac{m_{a,Man}(k)}{m_{Man}(k)} \end{cases} \quad \text{Eqns. 5.5-5.7}$$

Then, in step 522, the routine estimates the amounts of fuel, residuals and air in cylinder at BDC. in Eqns. 5.8–5.12. In an alternative embodiment, canister vapor purge fuel may also be accounted for in the intake manifold state updates.

$$\begin{cases} m_{f,Cyl,BDC}(k) = \Delta m_{f,Man,BDC}(k) + m_{f,cvp}(k) + (1 - X(k)) \\ \qquad W_{f,i}(k) \dfrac{30}{N(k)} + \dfrac{m_p(k)}{\tau(k)} \dfrac{30}{N(k)} \\ m_{r,Cyl,BDC}(k) = \Delta m_{r,Man,BDC}(k) + m_{r,cyl}^{nom}(k) \\ m_{a,Cyl,BDC}(k) = \Delta m_{a,Man,BDC}(k) \\ m_{Cyl,BDC}(k) = m_{a,Cyl,BDC}(k) + m_{r,Cyl,BDC}(k) + m_{f,Cyl,BDC}(k) \end{cases} \quad \text{Eqns. 5.8-5.12}$$

Next, at step 524, the routine estimates the amounts of pushed back fuel, residuals and air in Eqn2. 5.13 to 5.15.

$$\begin{cases} \Delta m_{f,pb}(k) = C_{pb}(k) \dfrac{m_{f,Cyl,BDC}(k)}{m_{Cyl,BDC}(k)} \\ \Delta m_{r,pb}(k) = C_{pb}(k) \dfrac{m_{r,Cyl,BDC}(k)}{m_{Cyl,BDC}(k)} \\ \Delta m_{a,pb}(k) = C_{pb}(k) \dfrac{m_{a,Cyl,BDC}(k)}{m_{Cyl,BDC}(k)} \end{cases} \quad \text{Eqns. 5.13-5.15}$$

Next, in step 526, the routine updates the intake manifold states (mass of gaseous fuel, residuals, air, and liquid fuel puddle)

$$\begin{cases} m_{f,Man}(k+1) = m_{f,Man}(k) - \Delta m_{f,Man,BDC}(k) + \Delta m_{f,PB}(k) \\ m_{r,Man}(k+1) = m_{r,Man}(k) - \Delta m_{r,Man,BDC}(k) + \Delta m_{r,PB}(k) \\ m_{a,Man}(k+1) = m_{a,Man}(k) - \Delta m_{a,Man,BDC}(k) + \\ \qquad \Delta m_{a,PB}(k) + C_{cyl}(k) \\ m_p(k+1) = m_p(k) + X(k) \cdot W_{f,i}(k) \cdot \dfrac{30}{N(k)} - \dfrac{m_p(k)}{\tau(k)} \cdot \dfrac{30}{N(k)} \end{cases} \quad \text{Eqns. 5.16-5.20}$$

When the answer to step 510 indicates Early Intake Valve Closure (EIVC) Charge Delivery Mode is being utilized, the routine continues to step 530. First, in step 530, the routine estimates total mass in intake manifold via equation 5.21.

$$m_{Man}(k) = m_{a,Man}(k) + m_{r,Man}(k) + m_{f,Man}(k) \quad \text{Eqn. 5.21}$$

Then, in step 532, the routine estimates actual charge per event entering and exiting the intake manifold, given the current estimate of the cylinder flow in equation 5.22.

$$C_{Cyl}(k) = W_{cyl}(k) \cdot \frac{30}{N}. \quad \text{Eqn. 5.22}$$

Next, in step 534, the routine estimates the change in mass of gaseous fuel, residuals and air in intake manifold as a result of charge being drawn into cylinder via equations 5.23–5.25.

$$\begin{cases} \Delta m_{f,Man}(k) = C_{Cyl}(k) \dfrac{m_{f,Man}(k)}{m_{Man}(k)} \\ \Delta m_{r,Man}(k) = C_{Cyl}(k) \dfrac{m_{r,Man}(k)}{m_{Man}(k)} \\ \Delta m_{a,Man}(k) = C_{Cyl}(k) \dfrac{m_{a,Man}(k)}{m_{Man}(k)} \end{cases} \quad \text{Eqns. 5.23-5.25}$$

Then, in step 536, the routine estimates the amounts of fuel, residuals and air in cylinder at IVC via equations 5.26–5.30. As above, canister vapor purge fuel contribution may be alternatively accounted for in the intake manifold state updates.

$$\begin{cases} m_{f,Cyl}(k) = \Delta m_{f,Man}(k) + m_{f,cvp}(k) + (1-X(k)) \\ \qquad W_{f,i}(k)\dfrac{30}{N(k)} + \dfrac{m_p(k)}{\tau(k)}\dfrac{30}{N(k)} \\ m_{r,Cyl}(k) = \Delta m_{r,Man}(k) + m_{r,cyl}^{nom}(k) \\ m_{a,Cyl}(k) = \Delta m_{a,Man}(k) \\ m_{Cyl}(k) = m_{a,Cyl}(k) + m_{r,Cyl}(k) + m_{f,Cyl}(k) \end{cases} \quad \text{Eqns. 5.26-5.30}$$

Finally, in step 538, the routine updates intake manifold states (mass of gaseous fuel, residuals, air, and liquid fuel puddle) via equations 5.31–5.34.

$$\begin{cases} m_{f,Man}(k+1) = m_{f,Man}(k) - \Delta m_{f,Man}(k) \\ m_{r,Man}(k+1) = m_{r,Man}(k) - \Delta m_{r,Man}(k) \\ m_{a,Man}(k+1) = m_{a,Man}(k) - \Delta m_{a,Man}(k) + C_{cyl}(k) \\ m_p(k+1) = m_p(k) + X(k) \cdot W_{f,i}(k) \cdot \dfrac{30}{N(k)} - \dfrac{m_p(k)}{\tau(k)} \cdot \dfrac{30}{N(k)} \end{cases} \quad \text{Eqns. 5.31-5.34}$$

In this way, it is possible to estimate the air, fuel, and residual amounts in the intake manifold and entering the cylinders even when the engine is operated in a plurality of valve closing modes, including early and late intake valve closing. Further, it is possible to estimate air, fuel, and residual amounts during transient operating conditions, including transitions between the two valve closing modes.

Figure 7:
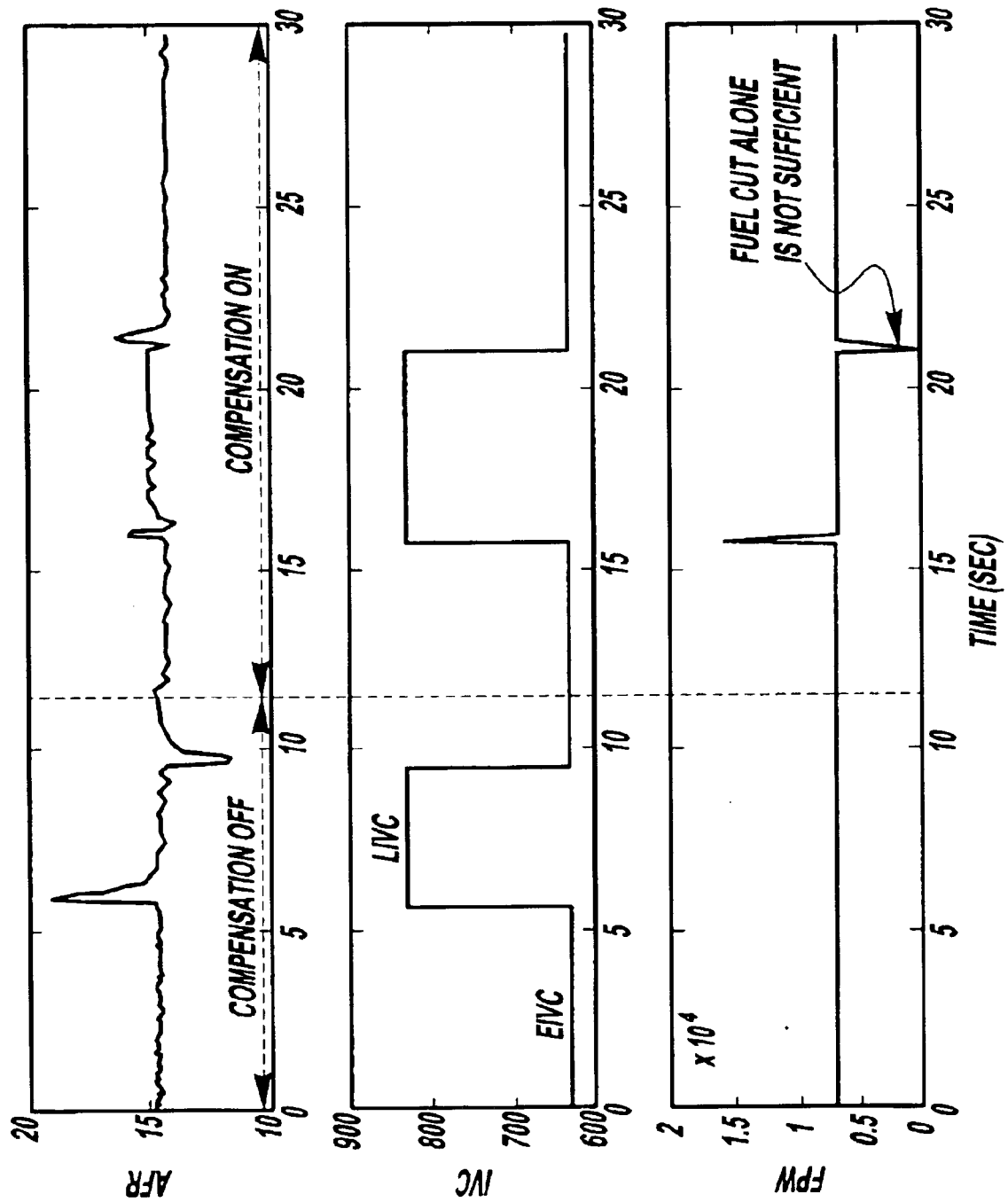
FIGS. 7–9 show experimental results by operation according to various features of example embodiments of present invention.
Figure 8A:
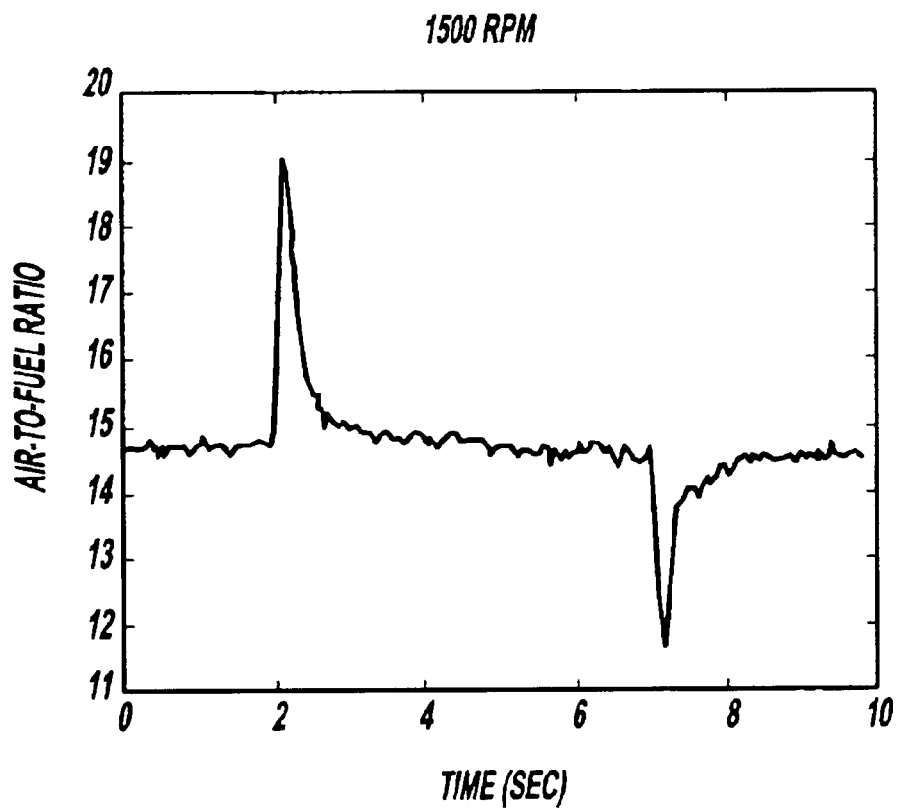
Figure 8B:
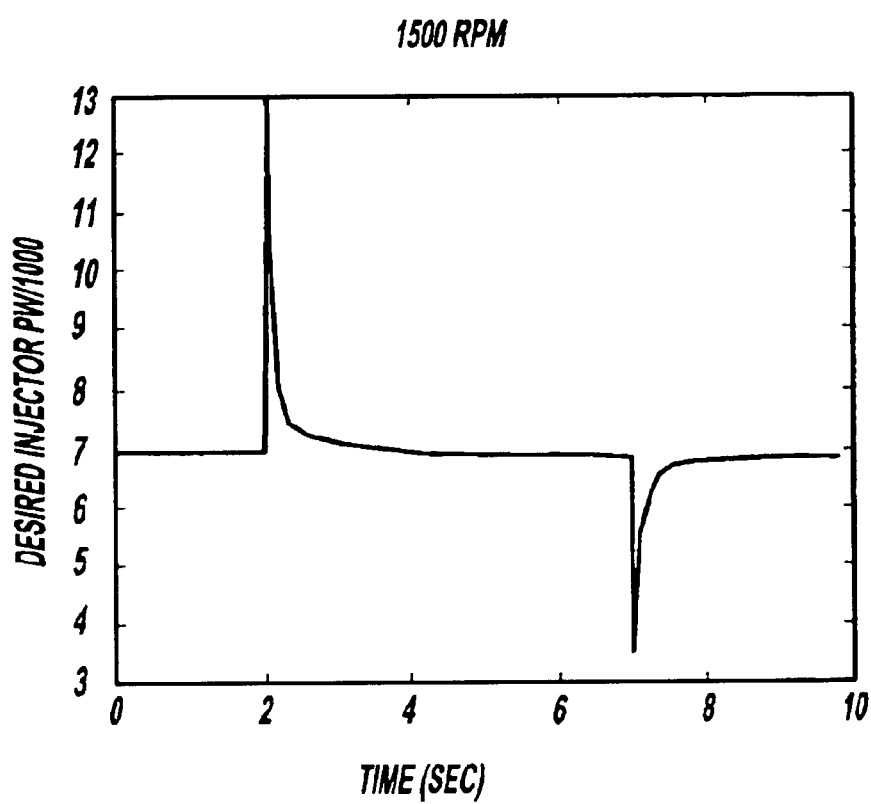
Figure 8C:
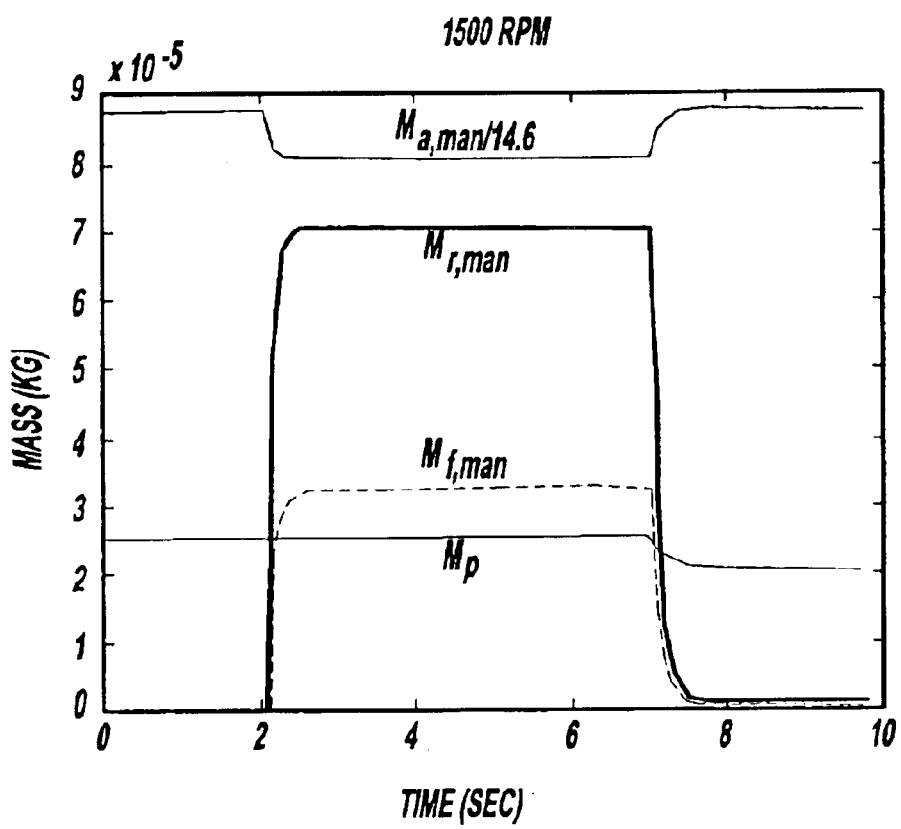
Figure 8D:
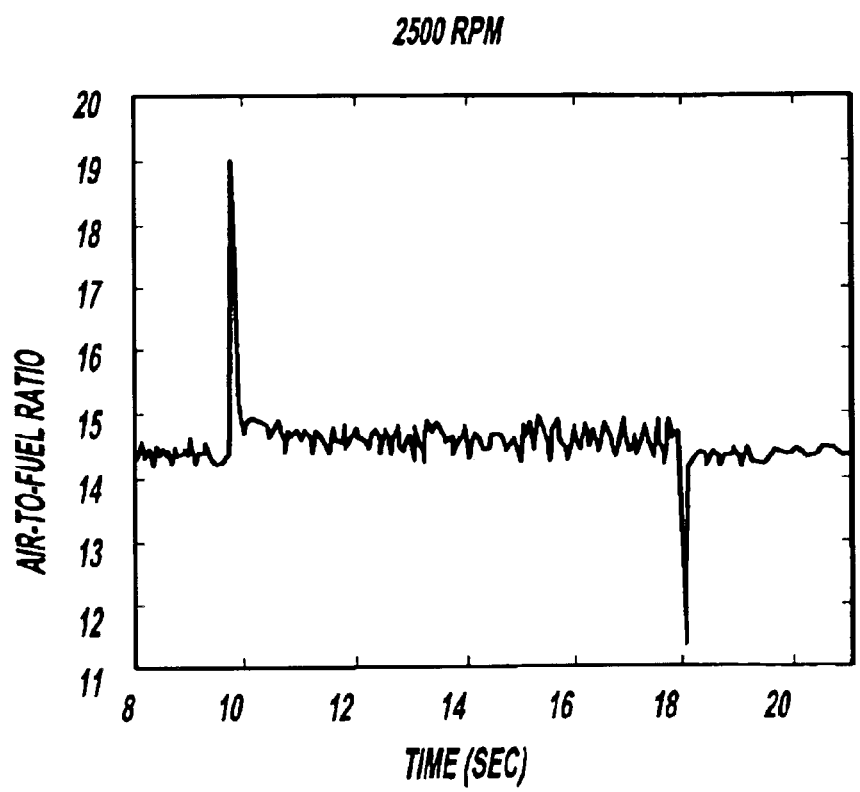
Figure 8E:
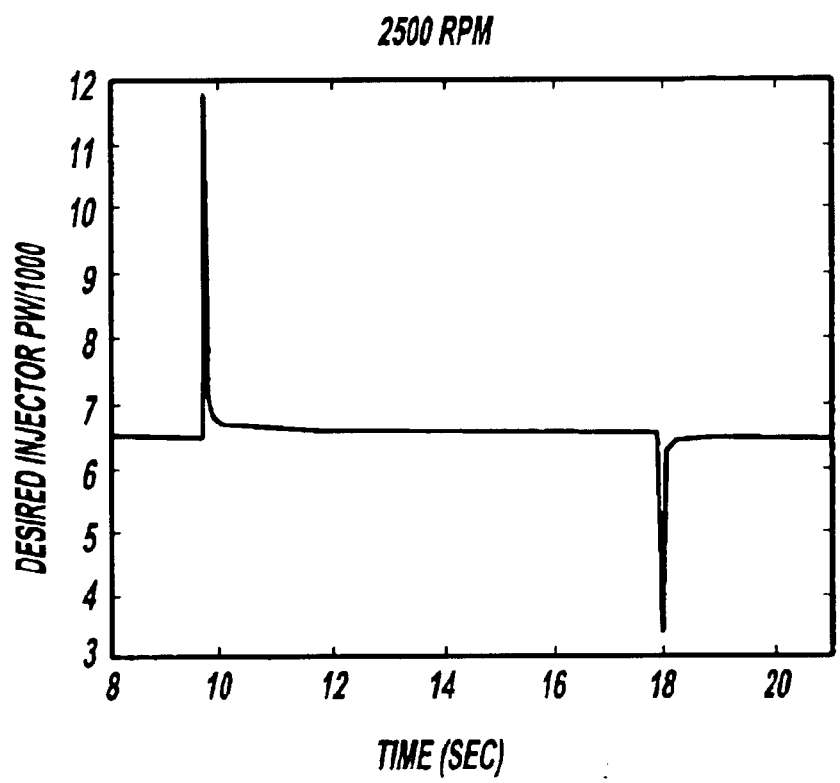
Figure 8F:
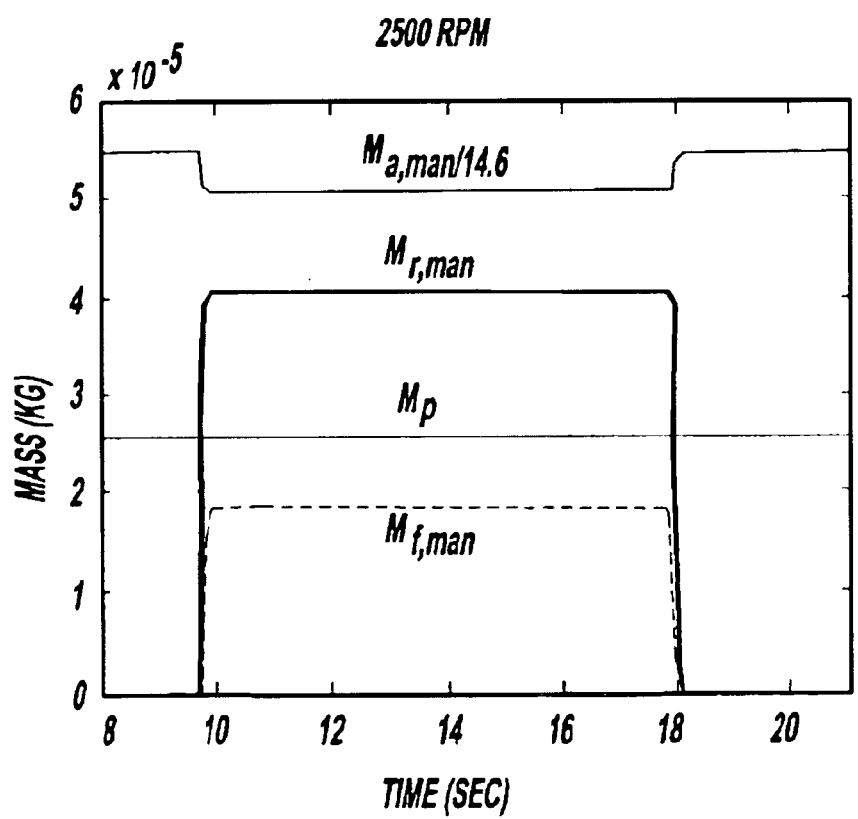
Figure 9A:
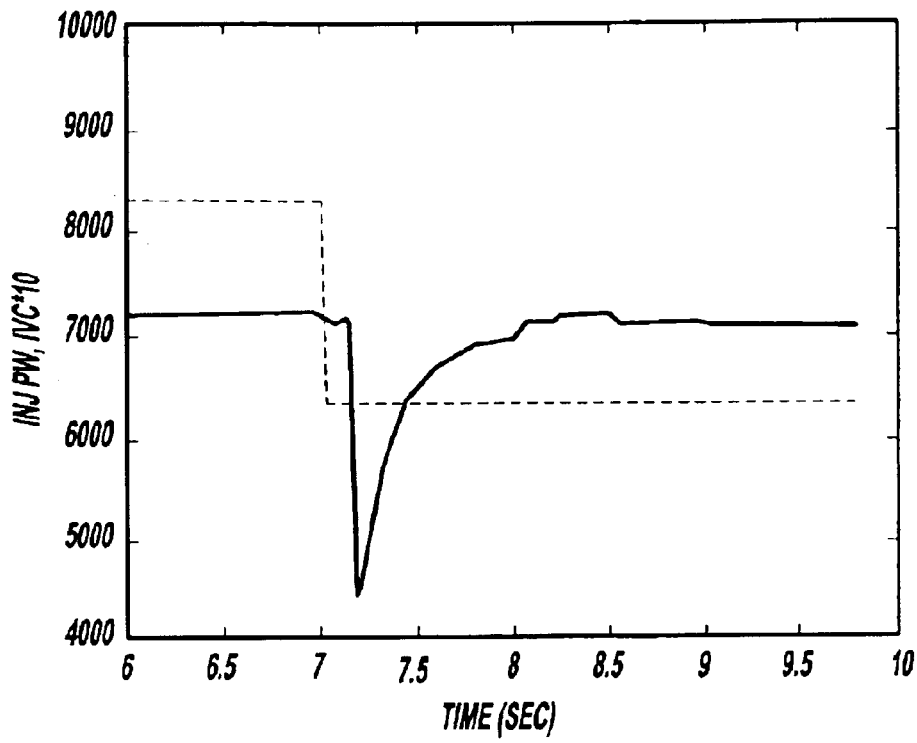
Figure 9B:
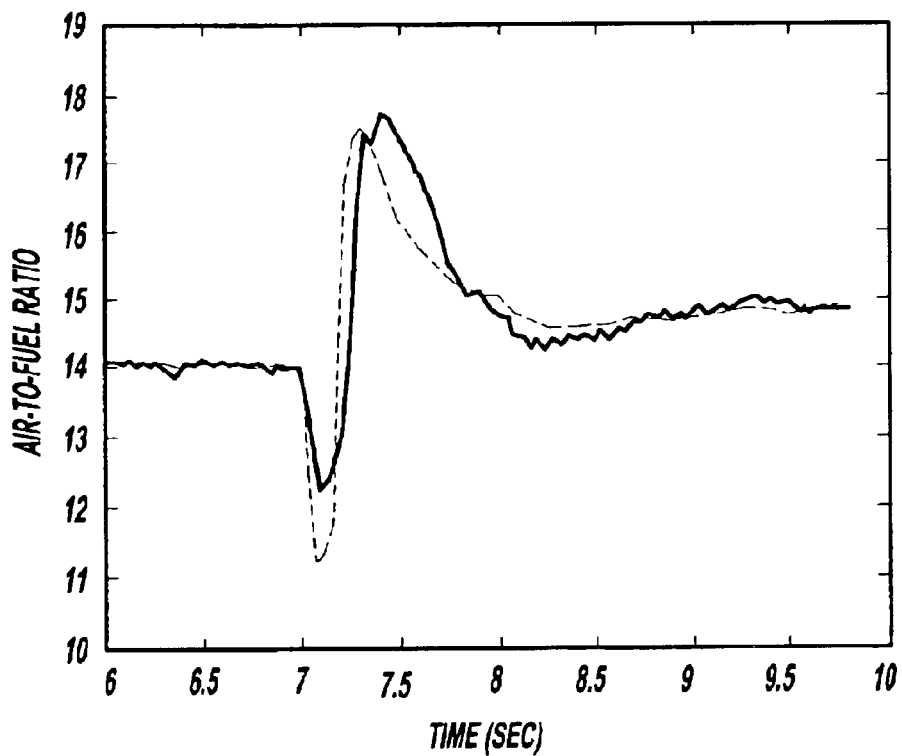
Figure 9C:
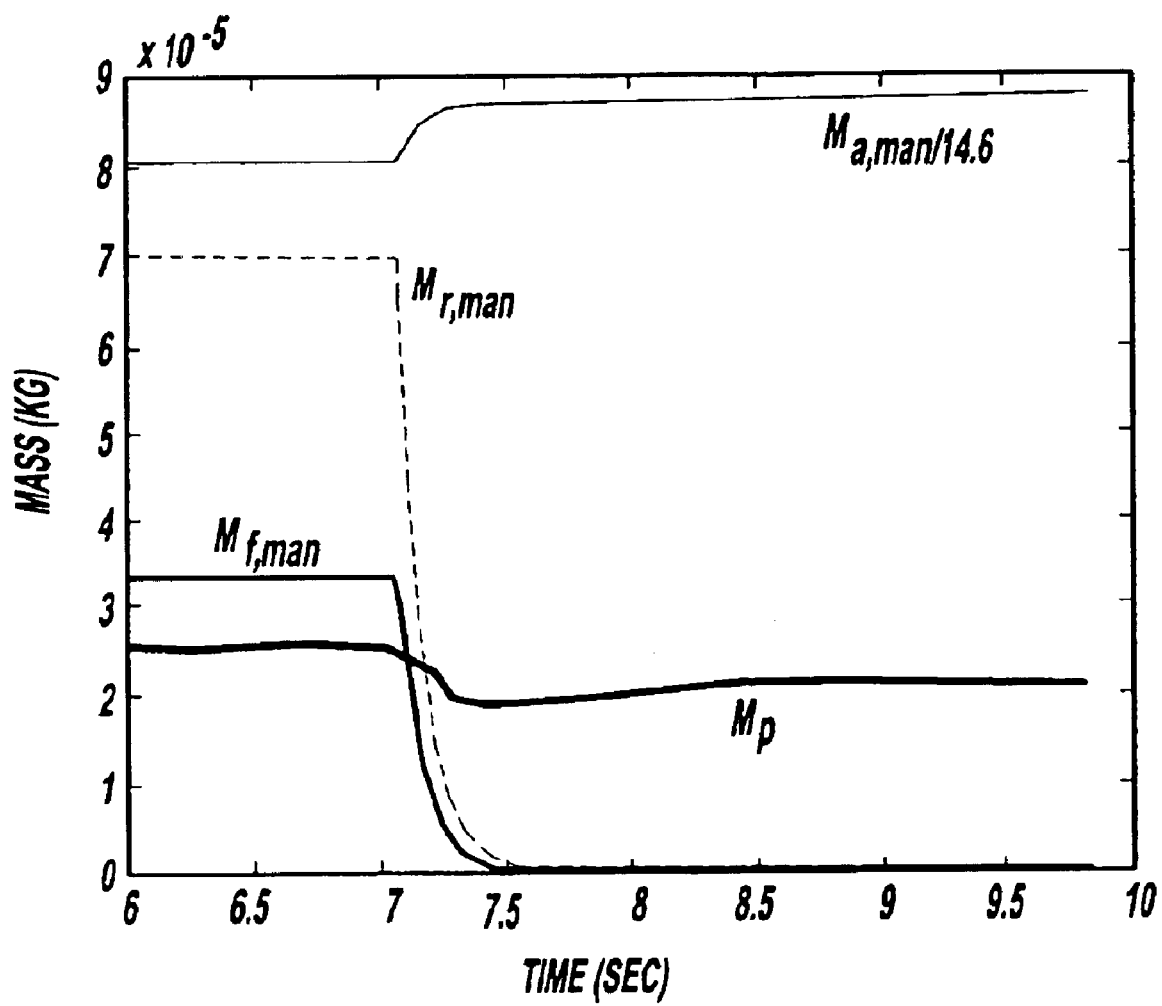

FIGS. 7–9 illustrate algorithm performance after appropriate tuning, which is depending on specific parameters of the engine and can be obtained through experimental testing. Note that the estimate predicts the exhaust air-fuel ratio deviations that occur when transition between valve closing modes.

Figure 6:
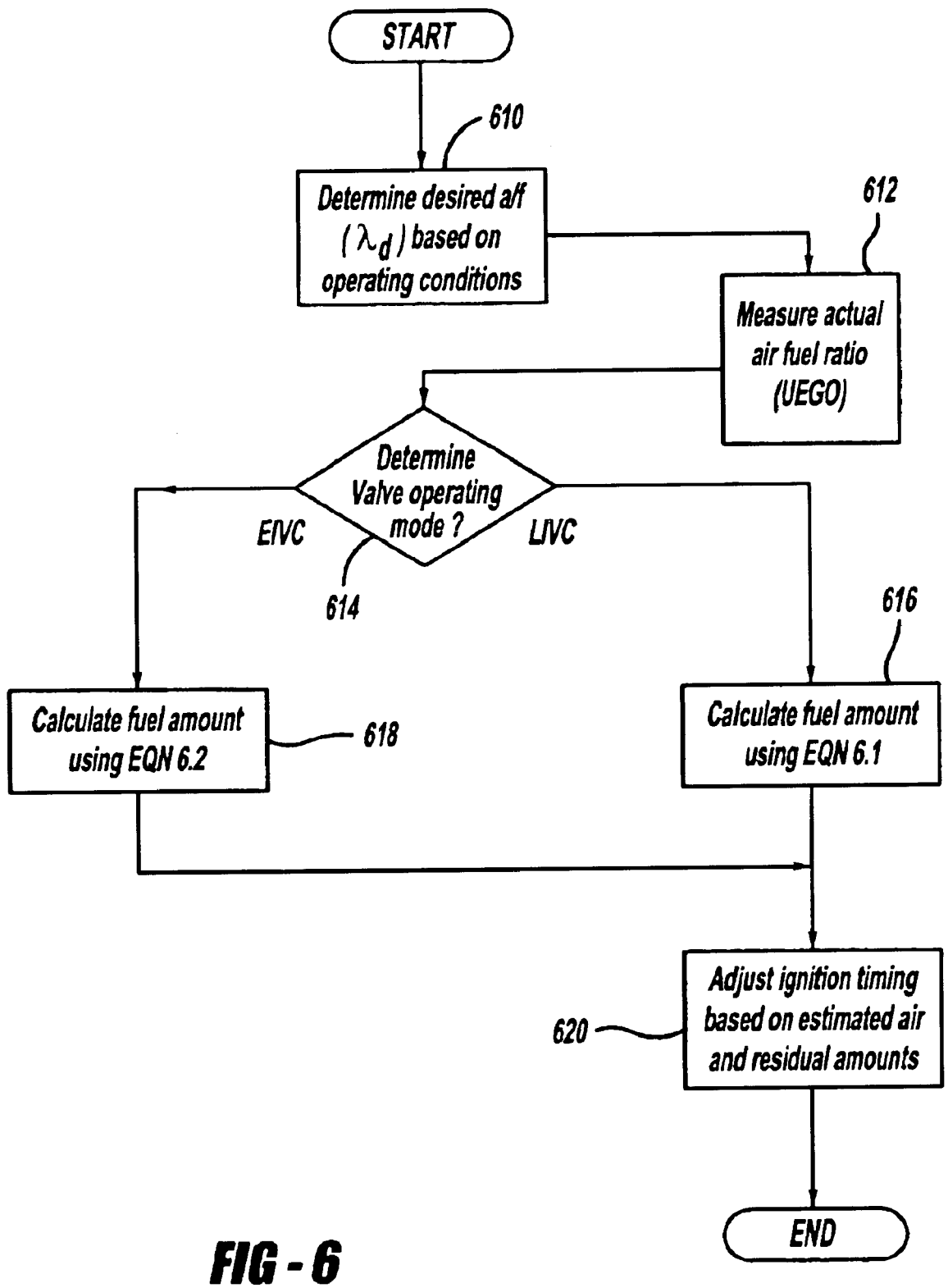

Referring now to FIG. 6, an air-fuel ratio controller is described that can be used to advantage to reduce exhaust air-fuel ratio variations when transitioning between valve timing modes. In general terms, the routine calculates the required fuel injection based on a desired air fuel ratio and an estimate of the air, fuel, and residuals that will enter the cylinder, depending on whether EIVC or LIVC is utilized. As described above, in one example the desired air-fuel ratio is approximately the stoichiometric value. Thus, during feedback air-fuel ratio control, the air-fuel ratio is controlled to oscillate about the stoichiometric value.

First, in step 610, the routine determines the desired air-to-fuel ratio $\lambda_d$ based on engine operating conditions, such as time since engine start, time between engine starts, engine coolant temperature, and various other parameters. Then, in step 612, the routine measures actual air-fuel ratio based on the UEGO signal. Note that the routine can operate in either an open loop mode (i.e., without feedback from the UEGO signal), or in closed loop control (i.e., with feedback from the UEGO signal) depending on operating conditions.

Then, in step 614, a determination is made as to whether the current operating mode is EIVC or LIVC. If the answer to step 614 is that the current mode is LIVC, then the routine continues to step 616 and, to maintain the desired air-to-fuel ratio $\lambda_d$, the following equation 6.1 determines the injected fueling rate:

$$W_{f,i}(k) = \frac{\left(\dfrac{\Delta m_{a,Man,BDC}(k)}{\lambda_d} - \Delta m_{f,Man,BDC}(k) - m_{f,cvp}(k) - \dfrac{m_p(k)}{\tau(k)}\dfrac{30}{N(k)}\right)}{(1 - X(k))\dfrac{30}{N(k)}} \quad \text{Eqn. 6.1}$$

Alternatively, in step 618, for EIVC mode, to maintain a desired air-to-fuel ratio $\lambda_d$, the following equation 6.2 determines the injected fueling rate.

$$W_{f,i}(k) = \frac{\left(\dfrac{\Delta m_{a,Man}(k)}{\lambda_d} - \Delta m_{f,Man}(k) - m_{f,cvp}(k) - \dfrac{m_p(k)}{\tau(k)}\dfrac{30}{N(k)}\right)}{(1 - X(k))\dfrac{30}{N(k)}} \quad \text{Eqn. 6.2}$$

The fueling rate to be injected in the EIVC mode as calculated from EQN. 6.2 may be negative. This means that the amount of pushed back fuel in the intake manifold is large and since it is not possible to take fuel in the intake manifold, this can result in a rich air-fuel if fuel is cut. As such, it may be necessary to completely stop fuel injection in this case. I.e., if the fueling rate calculated from EQN. 6.2 is negative, then the fueling rate is set to zero, and valve timing control is employed to provide a stoichiometric air-to-fuel ratio. Specifically, if $$W_{f,i}(k) = 0$$

and the cylinder flow is equal to $$C_{cyl,d}(k) = \frac{m_{f,cvp}(k) + \dfrac{m_p(k)}{\tau(k)} \cdot \dfrac{30}{N(k)}}{\lambda_d - \dfrac{m_{f,man}(k)}{m_{man}(k)}}$$

then the in-cylinder air-to-fuel ratio is equal to the desired value, $$\lambda(k) = \frac{m_{a,Cyl}(k)}{m_{f,Cyl}(k)} = \lambda_d.$$

The desired cylinder flow is commanded to the valve timing controller which calculates an adjusted IVC timing required to maintain desired A/F ratio:

$$IVC(k) = f^{-1}(C_{cyl,d}(k))$$

Due to larger cylinder airflow, this can result in increased torque from the engine. To compensate for this potential torque disturbance, the spark timing retard is set to cancel the torque increase, and thereby provide accurate air-fuel ratio control and torque control even when significant disturbances are caused by changes from EIVC to LIVC or vice versa.

Further, as indicated above, feedback correction based on UEGO sensor measurements can be added to the numerators of these expressions, if feedback correction is desired.

In this way, the routine takes account of the air and fuel pushed back into the intake manifold and then inducted into subsequent cylinder events. Injected fuel is adjusted during the transition in valve operating modes so that errors in air-fuel ratio from the desired value are reduced. Thus, controller can adjust injected fuel to the cylinders based on the transient effects of changing valve timing, including by taking into account the air and/or fuel, pushed back into the intake manifold and inducted in subsequent engine cylinders.

In yet another alternative embodiment, the routine can further account for residuals when correcting ignition timing. Here, the in-cylinder masses of air and residuals are estimated and their ratio (burnt gas fraction) is used as an input to MBT spark tables in step 620.

Referring now to FIG. 7, data illustrates the results obtained by operation according to various aspects of the present invention. Specifically, the top graph illustrates the air-fuel ratio obtained with and without compensation during transitions from EIVC to LIVC and from LIVC to EIVC. Specifically, the middle graph shows when the transitions occur, and the bottom graph shows the adjustments made to injected fuel according to the compensation schemes described above. Further, the graph illustrates at approximately 21 seconds that in this transition, even stopping fuel injection may not completely compensate for the pushback effect. As described above, addition adjustment of valve timing (e.g., airflow), can further improve response if desired.

FIGS. 8A–8C show more detailed data for 1500 RPM conditions. These Figures show how the predicted air-fuel ratio based on the above equations compares with measured air-fuel ratio data. Specifically, FIG. 8A shows the close response between the model (dashed) and the data (solid). FIG. 8B shows the desired fuel pulse width that would be generated to compensate for this disturbance according to the equations described above. Further, FIG. 8C shows internal model states. FIGS. 8D–8F shows the same type of data for an engine speed of 2500 RPM.

Referring now to FIG. 9, additional results are shown illustrating model results at 1500 RPM showing that the mode can account for variations in both valve timing and changes in injected fuel.

Referring now to FIG. 10, a routine is described for determining the requested engine torque and engine airflow, and based thereon, controlling engine valve timing. First, in step 1010, the routine determines the driver request from signal (PP). For example, the routine determines a requested drive torque based on pedal position, and optionally adjusted based on vehicle speed. Further, various other driver requests approaches can be used. From step 1010, the routine continues to step 1012, where a determination is made as to whether the vehicle is operating in a mode other than the driver request mode. Other such modes include, for example: a cruise control mode where vehicle speed is used with a vehicle speed set point to control engine operation, traction control, where wheel slip is used to control engine output, idle speed control where engine speed is feedback controlled independent of driver input, or vehicle stability control. When the answer to step 1012 is "yes", the routine continues to step 1014 and determines the desired engine torque based on the other operating mode.

Alternatively, when the answer to step 1012 is "no", the routine continues to step 1016 and determines the desired engine torque based on the driver request in step 1010. For example, the routine can calculate desired engine torque based on the desired wheel torque and other parameters including gear ratio, and torque ratio across the torque converter. Then, the routine continues to step 1018 and determines the desired airflow based on the desired engine torque. This can be performed using engine maps including parameters such as engine speed, engine coolant temperature, air-fuel ratio, and various others. Alternatively, the routine can determine the desired air amount such as an air charge value based on the desired engine torque.

From step 1018 the routine continues to step 1020 to determine whether the desired air flow is less than a first threshold A-1 and whether engine speed is greater than a second threshold N-1. When the answer to step 1020 is "yes", the routine continues to step 1022 to operate with intake valve closing timing after bottom dead center of piston movement. Alternatively, when the answer to step 1020 is "yes" the routine continues to step 1024 to operate with valve closing timing of the intake valve before bottom dead center of piston movement. Note that the operation according to steps 1022 and 1024 can be referred to as late intake valve closing and early intake valve closing depending on whether the intake valve closing timing is before or after bottom dead center of the piston movement during the intake stroke. Finally, in step 1026, the routine controls valve timing (either early or late) to provide the desired air amount, and to thereby provide the desired engine torque and finally thereby to provide the desired driver request.

Figure 11A:
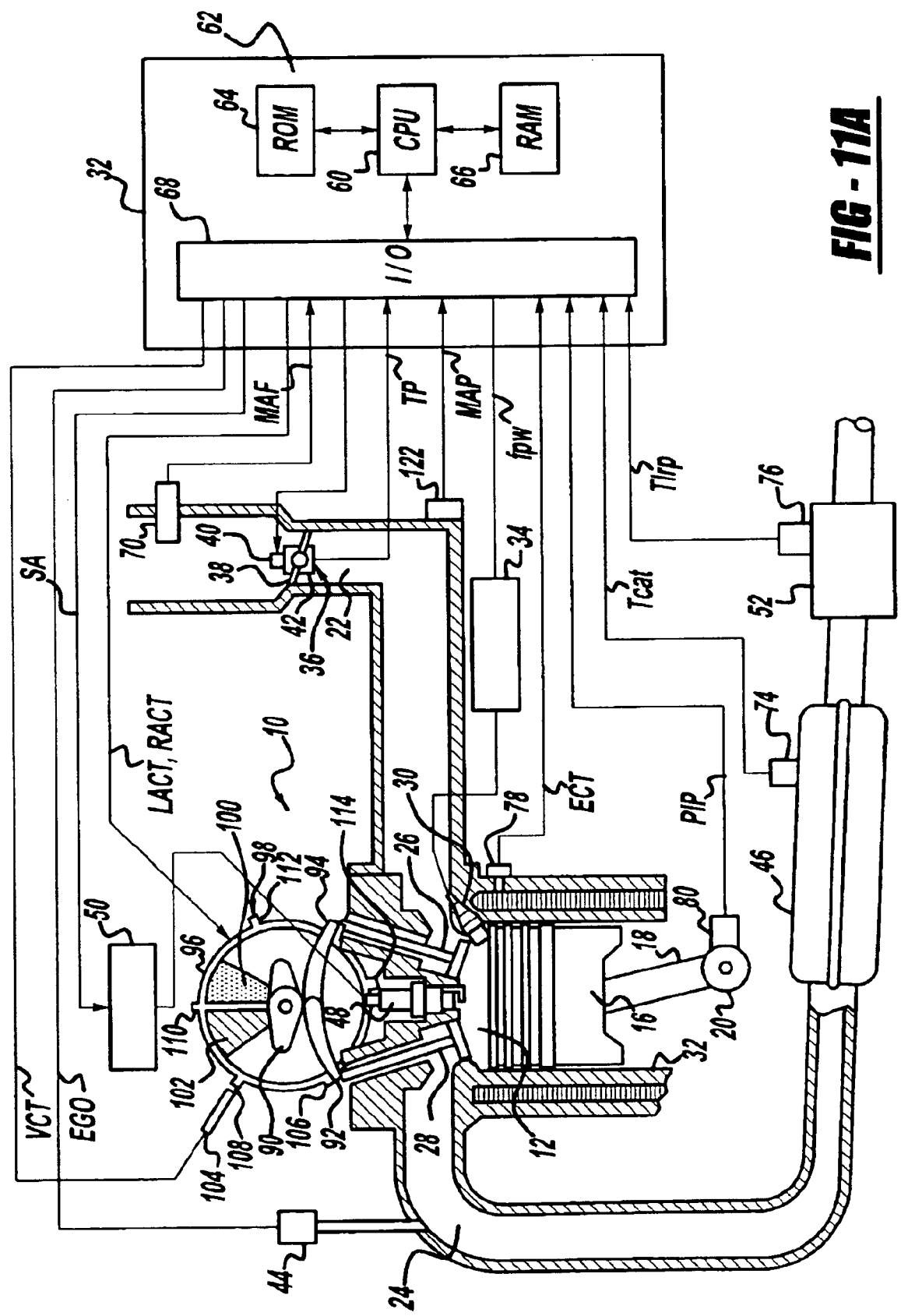
FIG. 11A shows a VCT engine.

Note that the invention is also applicable to other types of variable valve systems, with either variable valve lift or variable valve timing. One such example system is described below with regard to FIG. 11A, which shows a variable cam timing (VCT) system. Any suitable VCT mechanism can be used. For example, the VCT system can be a dual equal system where both intake and exhaust valves are adjusted equally via a common camshaft. Alternatively, only intake cam timing or exhaust cam timing can be utilized.

FIG. 1A shows a block diagram of an engine utilizing a variable cam timing system. This embodiment includes an engine 10 having a particular variable cam timing mechanism to provide valve-timing control. However, as stated above, the present invention is equally applicable to other types of variable cam timing (VCT) engines in addition to camless engines and variable valve timing engines.

The direct injection internal combustion engine 10 includes a plurality of combustion chambers or cylinders 12 having combustion chamber walls 14 with piston 16 positioned therein. Each piston 16 is coupled via a connecting rod 18 to crankshaft 20. Combustion chamber, or cylinder, 12, is shown communicating with intake manifold 22 and exhaust manifold 24 via respective intake valves 26 and exhaust valves 28. Fuel injector 30 is shown directly coupled to combustion chamber 12 for directly injecting fuel into cylinder 12 in one or more injections or events based on the pulse width of signal fpw generated by electronic engine controller 32 and conditioned or processed by conventional electronic driver 34.

Intake manifold 22 includes a throttle body assembly 36 having a throttle plate or valve 38 which may be used to modulate air flow through intake manifold 22. In this particular example, throttle plate 38 is coupled to electric motor 40 which receives control signals from controller 32 to position throttle plate 38 within intake manifold 22. The position of throttle plate 38 is monitored by an appropriate throttle position sensor 42 which provides a throttle position (TP) signal to controller 32. Closed-loop feedback control of the position of throttle plate 38 is performed by controller 32 to control airflow through intake manifold 22 and into cylinders 12. This configuration is commonly referred to as an electronic throttle control (ETC) or drive-by-wire system because there is no mechanical linkage between the driver's foot pedal and the throttle valve.

Exhaust gas oxygen sensor 44 is shown coupled to exhaust manifold 24 upstream of catalytic converter 46. In this particular example, sensor 44 provides a corresponding signal (EGO) to controller 32 which is then converted into an associated two-state signal (EGOS) used in closed loop lambda control. A high voltage state of signal EGOS indicates exhaust gases are rich of stoichiometry and a low voltage state of signal EGOS indicates exhaust gases are lean of stoichiometry. Various other types of exhaust gas sensors may also be used and have various advantages and trade-offs as well known by those of skill in the art.

Controller 32 controls operation of engine 10 and selects an appropriate operating mode for current operating conditions and driver demand. For example, in the case of a DISI engine, stratified or homogeneous operation can be selected. In a port fuel injected case, stoichiometric, rich, or lean operation can be selected.

To further reduce tailpipe emissions, a second three way catalyst (emission control device 52) may be used and is typically positioned downstream of catalytic converter 46. Device 52 absorbs the NOx produced when engine 10 is operating lean of stoichiometry. Device 52 can then be periodically purged or regenerated to maintain its effectiveness. During a purge cycle, engine 10 is operated in a rich or stoichiometric homogeneous mode such to increase reductants (such as HC and CO) in the feedgas passing through LNT 52. The excess HC and CO reacts with the stored NOx to purge or regenerate device 52.

Engine controller 32 is shown in FIG. 1A as a conventional microcomputer including a microprocessor unit 60 in communication with various computer readable storage media, indicated generally by reference numeral 62, via a data and address bus. Computer readable storage media 62 preferably include physical memory devices such as read-only memory (ROM) 64, random-access memory 66, and the like capable of storing data representing executable instructions and calibration information used by microprocessor 60 to control engine 10. Computer readable storage media 62 may include various other types of temporary or persistent memory or storage such as EPROM. EEPROM, flash, or any other type of magnetic, optical, or combination devices capable of data storage. Controller 32 also includes various input/output ports 68 which may provide signal conditioning, detection, scaling, short circuit protection, and the like, to communication with various sensors and actuators in controlling engine 10.

In operation, controller 32 receives signals from various sensors preferably including a mass air flow sensor (MAF) 70, a manifold pressure sensor (MAP) 72, a catalyst temperature sensor (Tcat1) 74, an LNT temperature sensor (Tcat2) 76, an engine coolant temperature sensor (ECT) 78, a and a crankshaft position sensor 80, for example. An engine speed signal (RPM) is generated by controller 32 from an ignition profile signal (PIP) generated by crankshaft position sensor 80 in response to rotation of crankshaft 20.

Continuing with FIG. 1A, camshaft 90 of engine 10 is shown communicating with rocker arms 92 and 94 for actuating intake valves 26 and exhaust valves 28 to control the air charge entering cylinder 12 and the exhaust gases exiting cylinder 12. Camshaft 90 is directly coupled to housing 96. Housing 96 forms a toothed wheel having a plurality of teeth 98. Housing 96 is hydraulically coupled to an inner shaft (not shown), which is in turn directly linked to camshaft 90 via a timing chain (not shown). As such, housing 96 and camshaft 90 rotate at a speed substantially equivalent to the inner camshaft. The inner camshaft rotates at a constant speed ratio relative to crankshaft 20.

Variable cam timing is provided by manipulation of the hydraulic coupling to change the relative position of camshaft 90 to crankshaft 20. The hydraulic coupling is manipulated by varying hydraulic pressures in advance chamber 100 and retard chamber 102. Controller 32 sends control signals (LACT,RACT) to conventional solenoid valves (not shown) to control the flow of hydraulic fluid either into advance chamber 100, retard chamber 102, or neither. By allowing high pressure hydraulic fluid to enter advance chamber 100, the relative relationship between camshaft 90 and crankshaft 20 is advanced. Thus, intake valves 26 and exhaust valves 28 open and close at a time earlier than normal relative to crankshaft 20. Similarly, by allowing high pressure hydraulic fluid to enter retard chamber 102, the relative relationship between camshaft 90 and crankshaft 20 is retarded. Thus, intake valves 26 and exhaust valves 28 open and close at a time later than normal relative to crankshaft 20.

Teeth 98, being coupled to housing 96 and camshaft 90, allow for measurement of relative cam position via cam timing sensor 104 by providing a signal (VCT) to controller 32. Teeth 98 preferably include equally spaced teeth 106, 108, 110, and 112 which can be used for measurement of cam timing, in addition to a tooth 114 preferably used for cylinder identification.

Figure 11B:
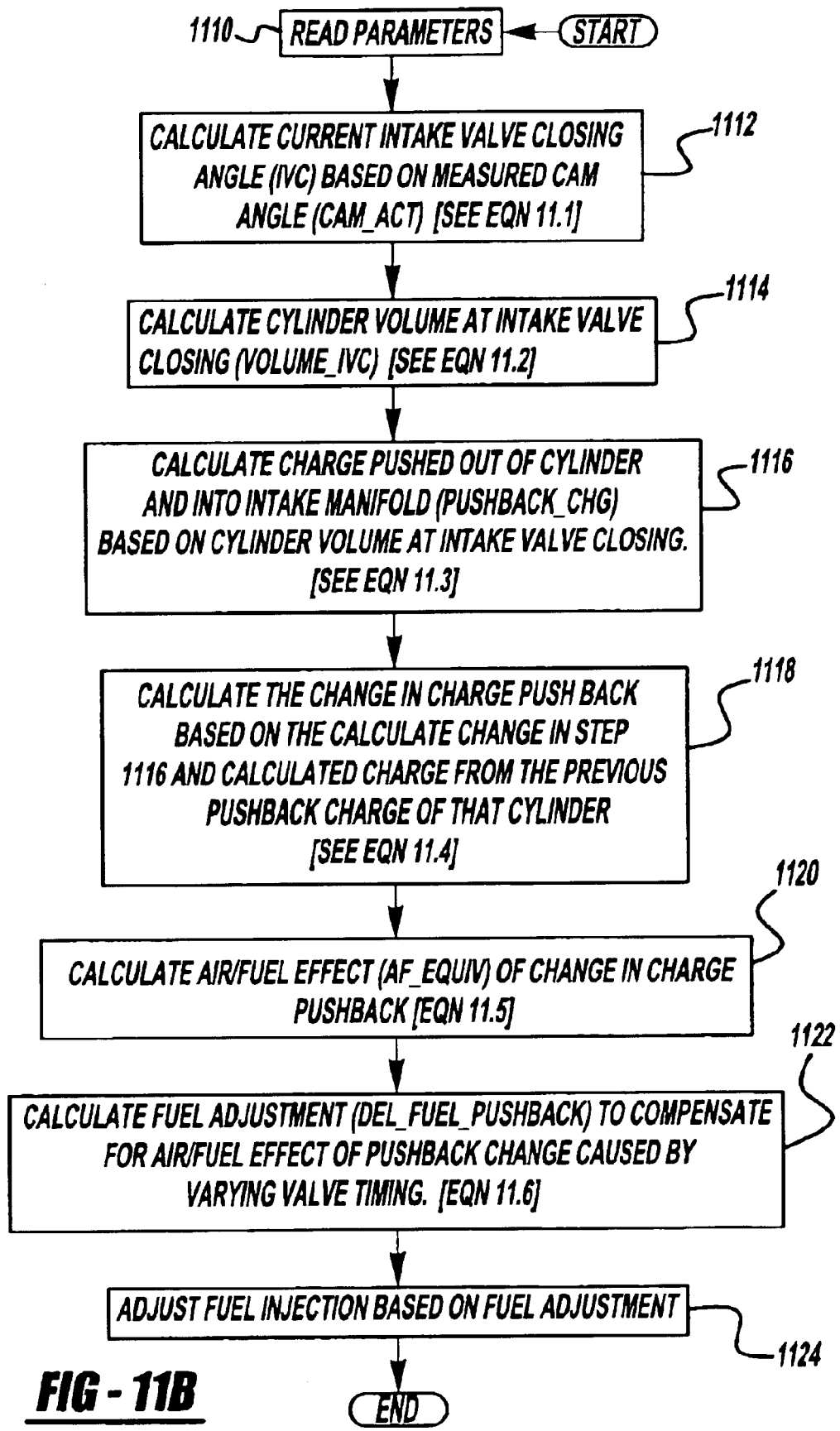
FIG. 11B shows an alternative embodiment flow chart.

An alternative embodiment is now described for using pushback estimation to account for air-fuel ratio errors due to variations in cam timing of the cam timing system described above with regard to FIG. 11A. Specifically, referring now to FIG. 11B, a routine is described for adjusting fuel injection based on pushback estimation. This routine is executed at engine firing events, rather than at a fixed sample time.

First, in step 1110, the routine reads various parameters of the engine and valve system. These parameters include the valve opening duration (DURATION), the nominal intake valve opening (IVO), the maximum volume (VMAX, engine displacement plus clearance volume), regression parameters (INT, LIN, and SQR, described below with regard to FIGS. 12A and 12B.

Then, in step 1112, the routine calculates the current intake valve closing angle (ivc) based on the measured cam angle (cam_act) as shown below in equation 11.1.

$$ivc = cam\_act - IVO + DURATION - 180 \quad \text{EQN 11.1}$$

Next, in step 1114, the routine calculates the cylinder volume at intake valve closing (volume_ivc) according to equation 11.2.

$$volume\_ivc = INT + LIN*ivc + SQR*ivc2 \quad \text{EQN 11.2}$$

Figure 12A:
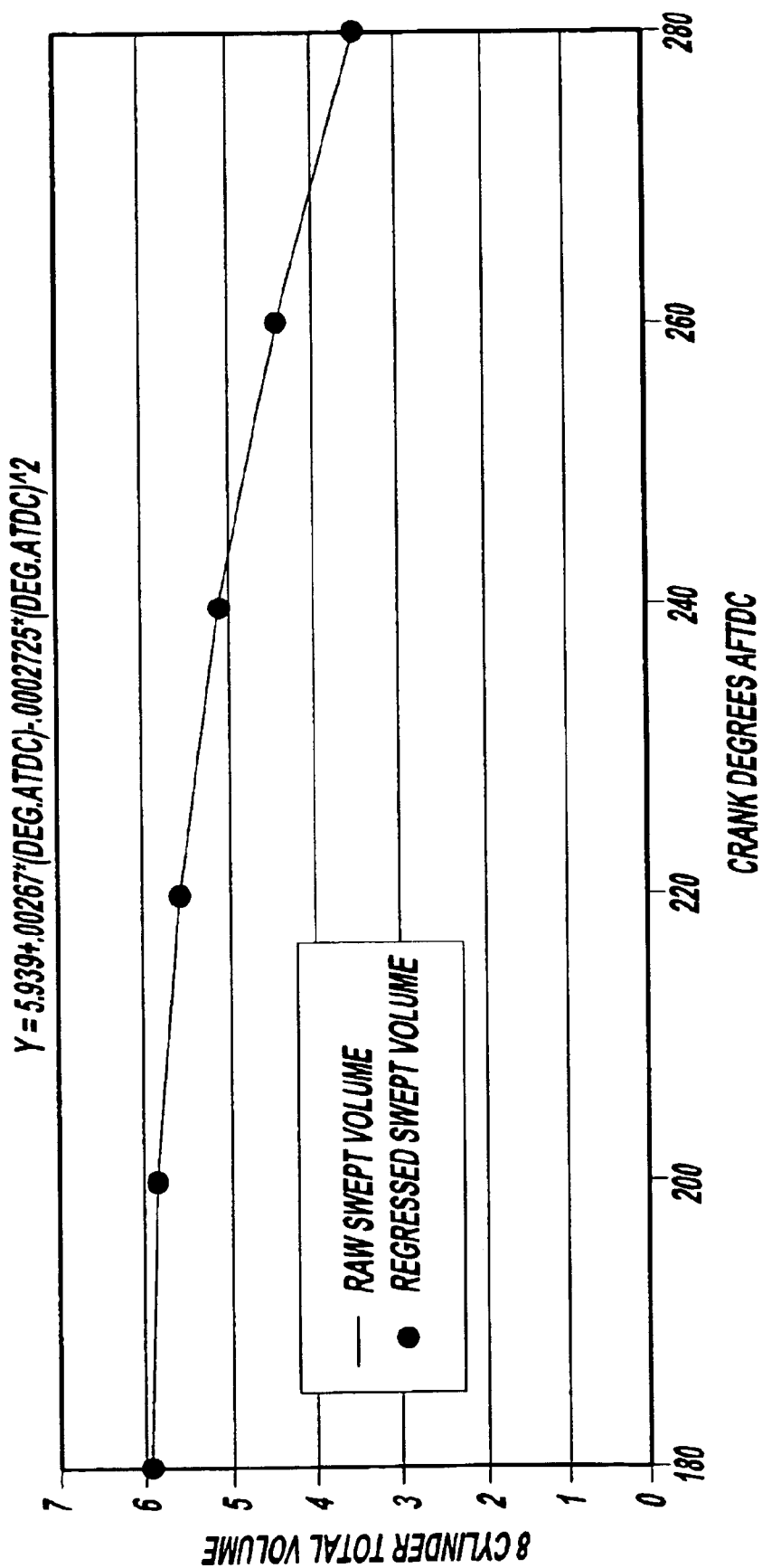
FIG. 12A–B show variation of engine volume as a function of crank degrees and regression approximations.
Figure 12B:
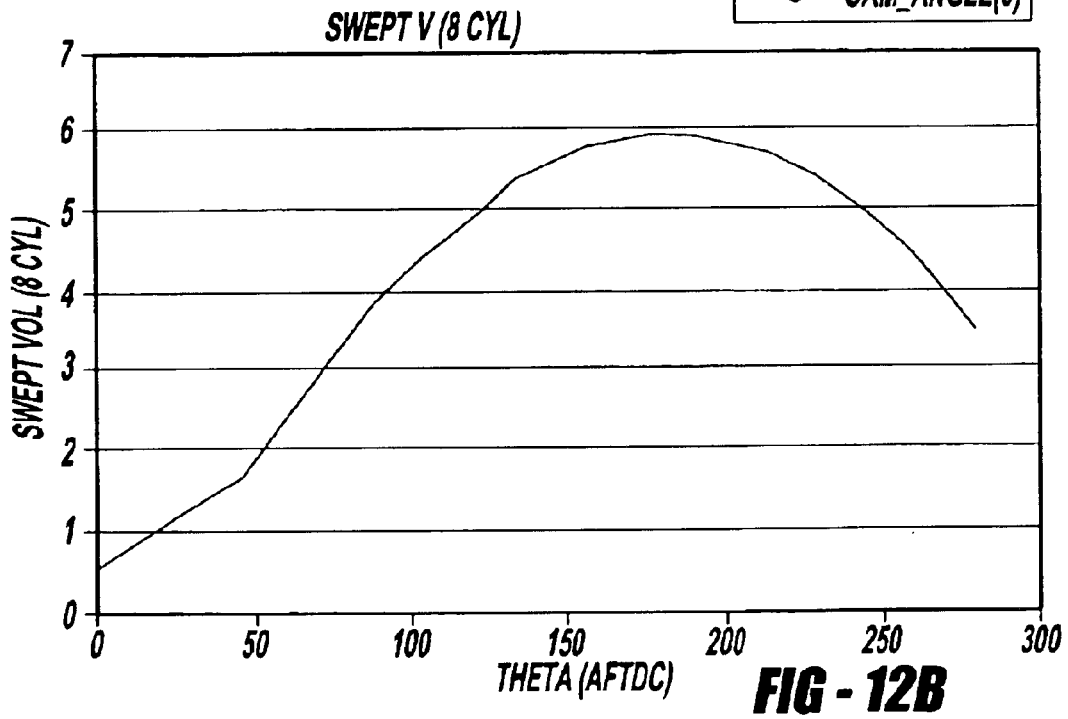

The terms INT, LIN, and SQR are obtained by regressing the swept volume versus intake valve closing timing, in the region of adjustment, as shown below in FIGS. 12A and 12B. FIG. 12A shows the variation across all valve closing, whereas FIG. 12B shows the region of actual valve adjustment for the particular dual equal VCT example.

Next, in step 1116, the routine calculates the charge pused out of the cylinder and into the intake manifold (pushback_chg) based on cylinder volume at intake valve closing as shown in equation 11.3 below.

$$pushback\_chg = ((VMAX - volume\_ivc)/VMAX)*archg*pushback\_n\_mul \quad \text{EQN 11.3}$$

where airchg is the estimated air charge in the cylinder (determine from the mass air flow sensor and engine speed), and pushback_n_mul is a multiplier determined as a function of engine speed, which can be done at a rate slower than the execution of FIG. 11.

Then, in step 1118, the routine calculates the change in charge pushback based on the calculated charge in step 1116 and calculated charge from the previous pushback charge of that cylinder as shown in equation 11.4.

$$del\_pushback\_chg = pushback\_chg(i) - pushback\_chg(i-8) \quad \text{EQN 11.4}$$

Note that the index (i) here is for each cylinder event. As such, (i−8) is for the case of an 8 cylinder engine. If a four cylinder engine were used, then a value of 4 would be used in place of 8 in equation 11.4.

Next, in step 1120, the routine calculates the air-fuel effect (AF_equiv) of a change in charge pushback as shown in equation 11.5.

$$AF\_equiv = (airch + del\_pushback\_chg)/airchg*NOMAF \quad \text{EQN 11.5}$$

where NOMAF is a nominal air-fuel ratio value, such as stoichiometry.

Then, in step 1122, the routine calculates a fuel adjustment amount (del_fuel_pushback) to compensate for air-fuel effects of pushback charge caused by varying the valve timing as shown in equation 11.6.

$$del\_fuel\_pushback = del\_pushback\_chg/(lambse\_des*14) \quad \text{EQN 11.6}$$

where lambse_des is a desired air-fuel ratio determined based on engine operating conditions. Specifically, lambse_des is a control output of a feedback air-fuel ratio control system that adjusts injected fuel to maintain a desired air-fuel ratio based on exhaust gas oxygen sensors located in the engine's exhaust.

Finally, in step 1124, the routine adjusts fuel injected into the engine based on the fuel adjustment determined in step 1122.

While FIG. 11 shows a high-level flowchart, in an alternative embodiment, the following detailed code can also be used. This algorithm advantageously uses various arrays updated at different rates to optimize controller speed. Specifically, the algorithm uses a FIFO (First in first out) array with length of NUMCYL_0 (number of cylinders of the engine 10), to compensate for differences in pushed-back air/fuel mixture during a rapid VCT transition. Cell #0 of the array is updated at PIP edges (rising and/or falling) determined from the crank sensor. There is a complete PIP wave for each cylinder firing. The remainder of the array elements are pushed down one position (effectively discarding cell #[NUMCYL−1]). Each element of the FIFO array represents the differences in pushed-back fuel mass between the current cylinder event and N-th before.

At the same PIP edge, the fuelling calculation feature is already calculating a desired fuel mass (mf_cyl) for each injector based on the exhaust air-fuel ratio sensors and the mass air flow sensor. Elements of the FIFO array are added to each mf_cyl according to engine firing order. The additional compensation for push-back effects is not utilized until the engine exits cranking during a start.

This algorithm thus accounts for the magnitude of push-back phenomenon, however, the additional compensation may not take place in the cylinder where the error is created, but in subsequent cylinders, thereby obtaining an overall average reduction in air-fuel ratio errors. In other words, due to the time limitations for calculating and injecting fuel, compensation may occur in a subsequent cylinder to correct air-fuel errors that are estimated in a previous cylinder.

The algorithm uses the following calibration parameters
FUL_IVO: Intake valve open duration at zero VCT (deg.).
initial value=225+7.5=232.5
ENG_VMAX: Maximum engine volume including both displacement and clearance (L).
initial value=5.94
FNFUL_PB_MUL(engine_speed): Push-back fuel mass multiplier for engine speed.
initial value=1, length 6, updated at a rate of 50 ms
FUL_PB_COE[3]: Coefficients for the quadratic cylinder volume regression equation.
FUL_PB_COE[0]=−6.8177
FUL_PB_COE[1]=0.13107
FUL_PB_COE[2]=−0.0003376
PB_CYL_EVNT: Number of cylinder events to look back when determining the differences in pushed-back fuel mass.
initial value=8 (same as NUMCYL_0, however, a different value can be used based on engine test results. For example, a smaller number or a larger number could be used with a maximum value of, for example, 12 for an 8-cylinder engine).

The following are RAM Parameters:

| | |
|---|---|
| ful_ivc: | Actual intake closing angle (deg.). |
| eng_vol_ivc: | Engine volume at ful_ivc (L). |
| mf_pb[12]: | Pushed-back fuel mass at each cylinder event (lb.). |
| mf_pb_del[13]: | Differences in pushed-back fuel mass between cylinder events (lb.). |
| ful_pb_mul: | Push-back fuel mass multiplier. |
| eng_vol_rt: | Volume push-back ratio. |
| f_a_ave: | Average f_a_ratio between two banks. |

The following is a summary of the algorithm computations and code utilized. The code in section (1) is updated at a rate of 50 ms. The code in section (2) is updated at the same rate as the variable cam timing feedback position controller/or cam angle measurement, which is, for example, 16 ms. Section (3) shows the PIP task fuel calculation, and Section (4) shows the foreground fuel calculation.

```
(1) /* 50 ms task */
    ful_pb_mul=lookup_2d (& fnful_pb_mul, engine_
        speed);
    f_a_ave=(f_a_ratio[0]+f_a_ratio[1])/2.0;
```

Section (1) calculates the pushback multiplier calibration value (ful_pb_mul) which is a function of engine speed of the operating engine. Further, this section calculates the average fuel-air ratio of the two cylinder banks, in the case where a two-bank engine is utilized. Of course, however, a single bank engine, or a multi-bank engine can be used.

```
(2) /* Same task rate as VCT update, currently 16 ms. */
    ful_ivc=cam_act+FUL_IVO;
    eng_vol_ivc=FUL_PB_COE[0]+FUL_PB_COE[1]
        *ful_ivc+FUL_PB_COE[2]*ful_ivc*ful_ivc;
    eng_vol_rt=(ENG_VMAX-eng_vol_ivc)/ENG_
        VMAX;
```

Section (2) provides an estimate of the engine volume which accounts for variation in the intake valve closing timing. This section utilizes the estimated regression data illustrated in FIGS. 12A and 12B.

```
(3) /* PIP task. */
    for (i = 1; i <= PB_CYL_EVNT; i++)
    {
    mf_pb[PB_CYL_EVENT-i] = mf_pb[PB_CYL_EVENT-i-1];
    }
    mf_pb[0] = cyl_air_chg * f_a_ave * eng_vol_rt *
    ful_pb_mul;
    for (i =1; i < NUMCYL_0; i++)
    {
    mf_pb_del[PB_CYL_EVENT -i] = mf_pb_del[PB_CYL_EVENT -
    i-1]
    }
    mf_pb_del[0] = mf_pb[0] - mf_pb[PB_CYL_EVNT];
    where PB_CYL_EVENT is the pushback cylinder event.
```

Section (3) provides the cylinder by cylinder estimate of the amount of push back fuel that is inducted in the current cylinder based on the push back fuel pushed into the intake manifold from previous cylinders. In this way, the change in push back fuel caused by the change in valve timing can be compensated by adjusting fuel injection into the engine. Specifically, the routine uses the estimated cylinder volume, average fuel-air ratio, and cylinder charge amount to estimate the pushed back fuel (mf_pb). Then, a difference in push back fuel (mf_pb_del) can be determined.

```
(4)     /* fuelling calculation feature – PIP task. */
    fuel_bk = f_a_ratio * cyl_air_chg + pcomp_lbm;
    for (i =1; i < NUMCYL_0; i++)
    {
    mf_cyl[i] = fuel_bk + mf_tfc[i];
    mf_cyl[i] = mf_cyl[i] + mf_pb_del[i];
    mf_cyl[i] = f32max(mf_cyl[i], 0.0);
    }
```

Finally, Section (4) shows an algorithm for adjusting the injected fuel request (mf_cyl) which accounts for the pushback fuel (mf_pb_del), fueling dynamics and wall wetting in the intake manifold (mf_tfc), fuel vapor purge (pcomp_lbm). These are all utilized with an estimate of the estimated cylinder charge (cyl_air_chg) and modified fuel air ratio (f_a_ratio, accounting for feedback from the exhaust gas oxygen sensors) to calculated the injected fuel.

Note that this algorithm can be modified to account for various other factors. For example, during injector cut-out, it can be disabled to prevent injecting fuel due to push-back effects.

Figure 13:
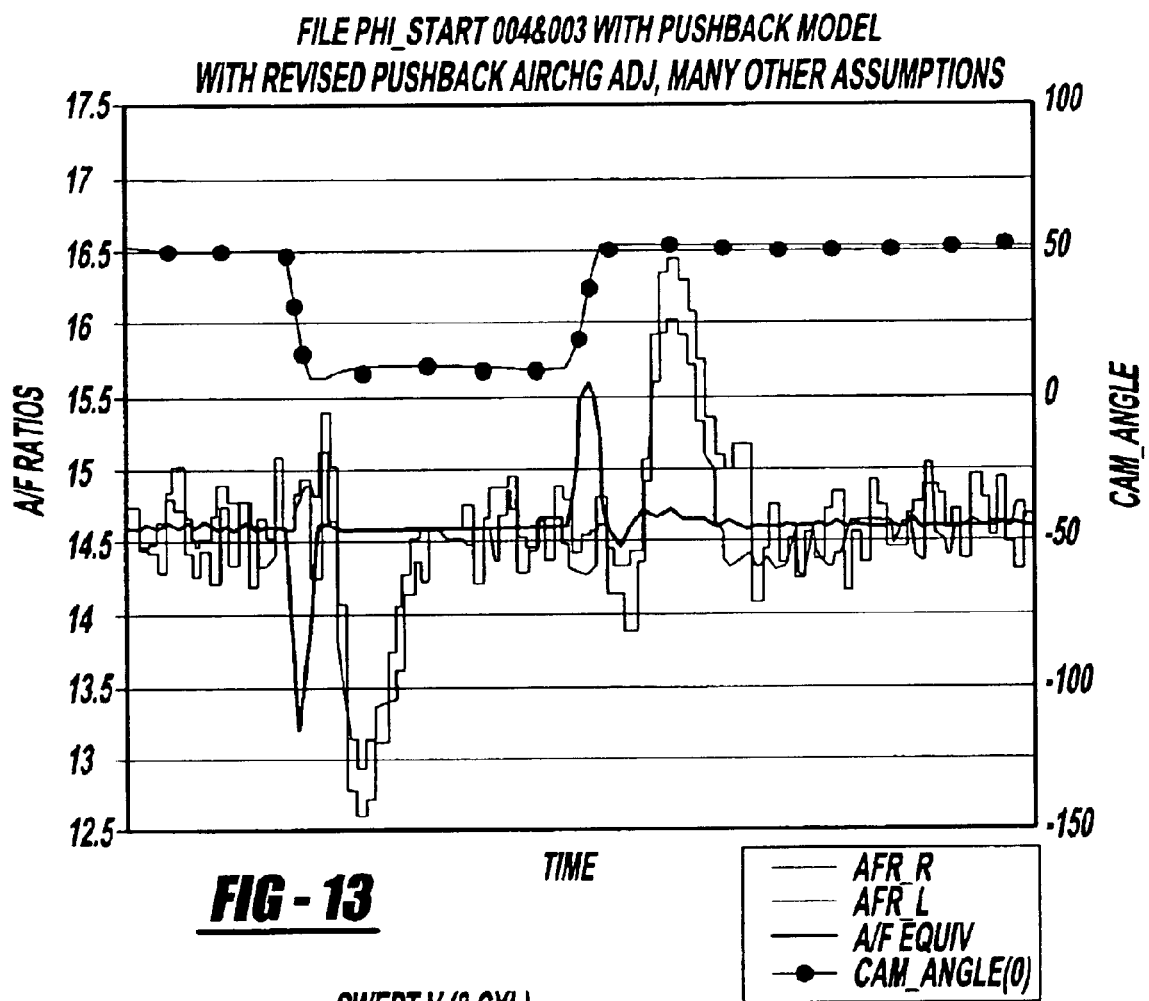
FIG. 13–14 shows experimental test data.

The air-fuel adjustment made (af_equiv), according to the routine of FIG. 11, is shown for experimental data in FIG. 13. Specifically, the adjustment value is shown to correlate with the air-fuel ratio deviations (afr_r and afr_l), but at an early enough time that fuel injection compensation can be made.

Figure 14A:
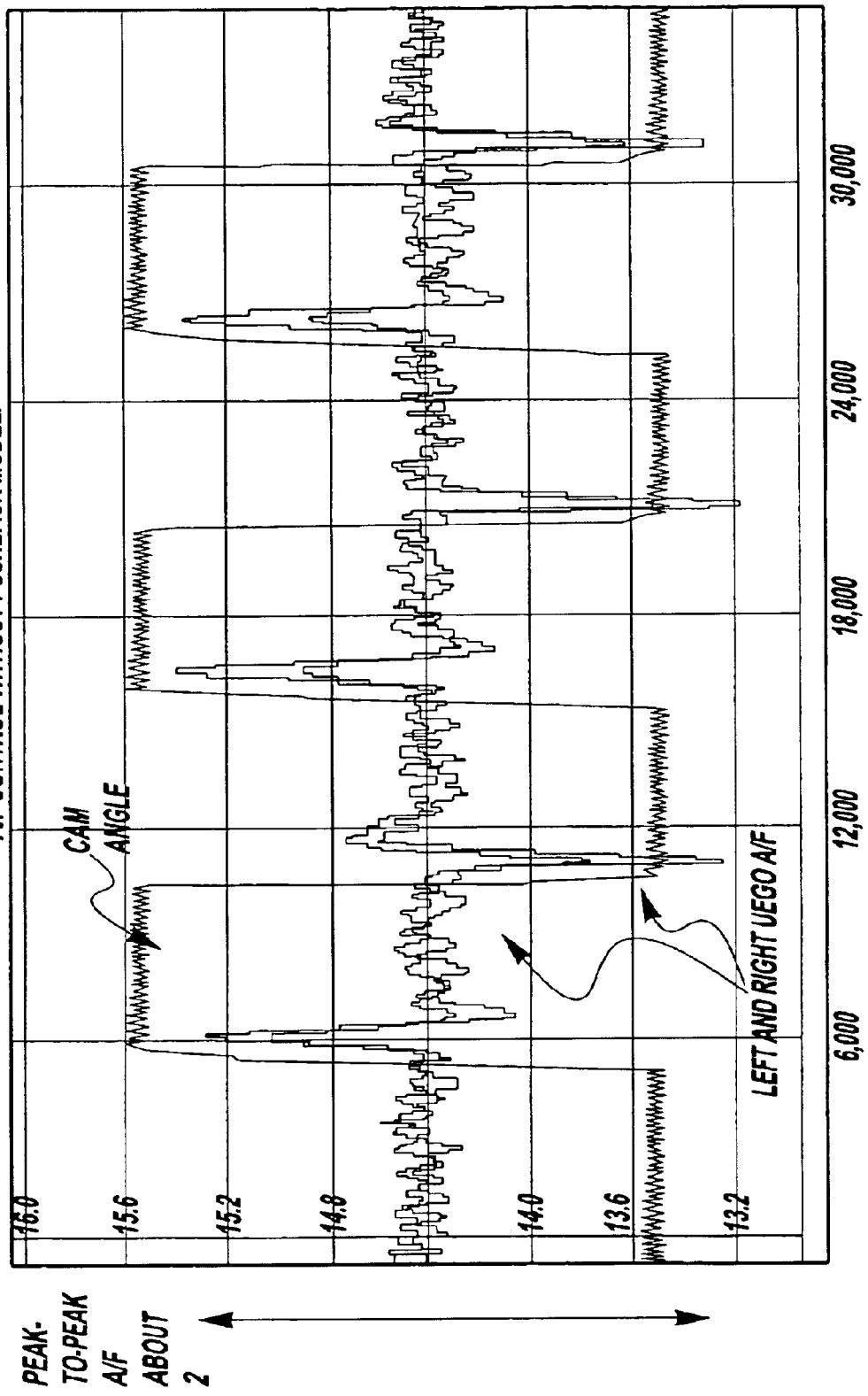
Figure 14B:
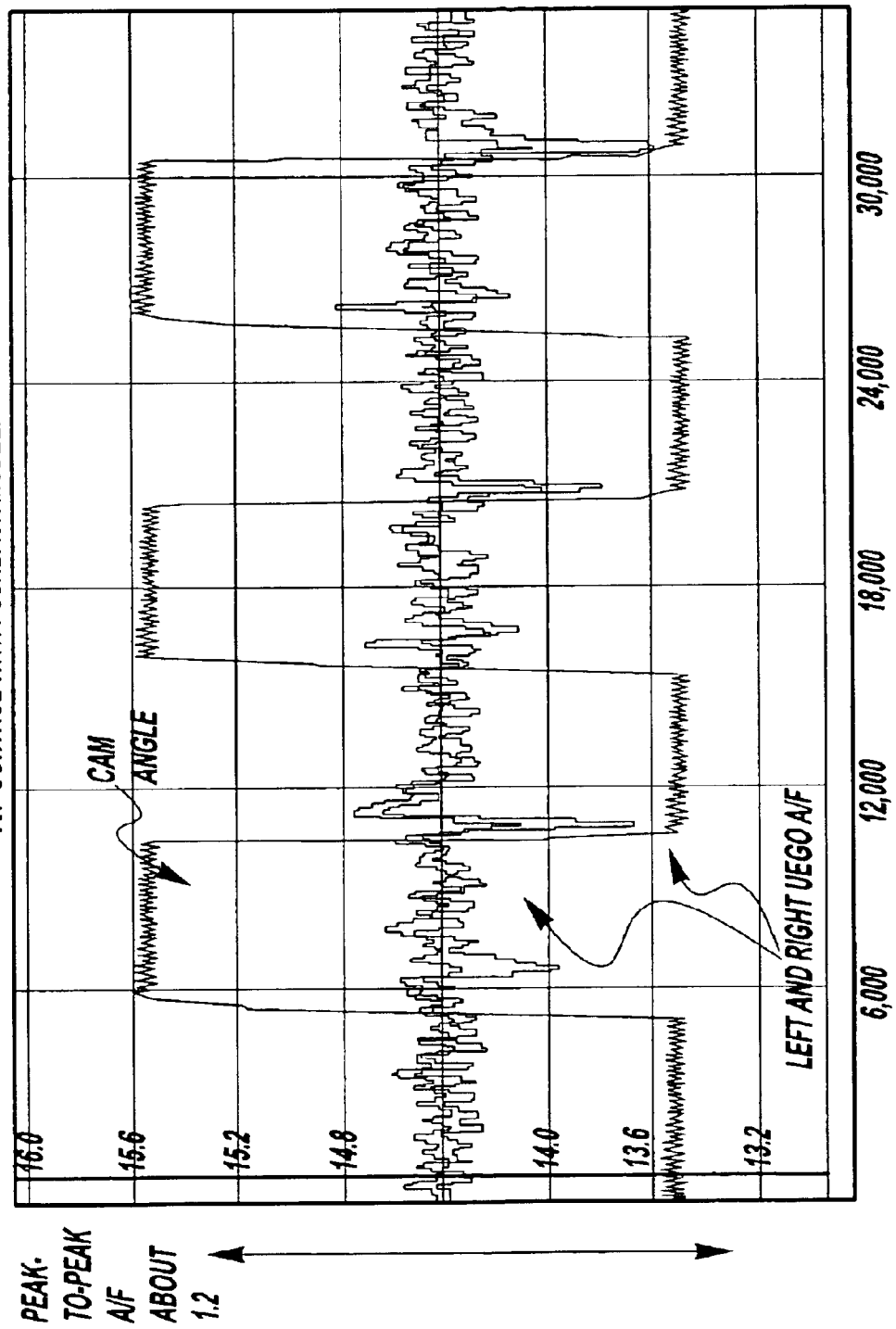

FIGS. 14A and 14B show before an after results according to this embodiment. The graphs show cam angle variations at the maximum slew rate, along with measured air-fuel deviations. FIG. 14A shows operation without compensation, and FIG. 14B shows operation with compensation. The results with compensation show a considerably reduced air-fuel ratio error.

In still another alternative embodiment, the amount of pushback is not set proportional to the amount of air charge (as is used above), but rather determined as follows. Specifically, the amount of pushed back medium increases with decreasing air charge at late intake valve closing, for example.

A further correction to the example described above with regard to FIGS. 11–14 is shown for the case where pushback_n_mul=1, for example, (which holds for low engine speeds) and assuming the in-cylinder pressure during the part of the compression stroke before IVC is approximately equal to MAP. The air_chg can be written as $$air\_chg = (MAP/RT) * V\_ivc * (1 - d - 1/AF\_ratio)$$

where d is the percent dilution in the cylinder. This can be a percentage of residual dilution, or a ratio of dilution, for example. Under the above assumptions, and using the pushback model previously described, the amount of air pushed back is:

$$pushback\_chg\_new = (MAP/RT) * (V\_max - V\_ivc) * (1 - d - 1/AF\_ratio) = ((V\_max - V\_ivc)/V\_ivc) * air\_chg$$

This compares to the previous expression:

$$pushback\_chg = ((V\_max - V\_ivc)/V\_max) * air\_chg$$

Note that the pushback_chg_new is larger that the pushback_chg by a factor V_max/V_ivc. At the nominal IVC of 60 deg ABDC (after bottom dead center), this is approximately equal to 1.3 for one example engine. In another case, it is 1.22. More importantly, the effects of a delta change in V_ivc on pushback is multiplied by $(V\_max/V\_ivc)^2$ which is equal to 1.8 (or 1.5 if the other case) when delta's are taken around IVC=60, for the example engine.

That is, delta pushback_chg_new/delta $V\_ivc$=1.8*(delta pushback_chg/delta $V\_ivc$).

In this way, further accuracy can be obtained.

We claim:

1. An electronically controlled system, comprising:

a computer storage medium having a computer program encoded therein for controlling fuel injected into an internal combustion engine having an intake manifold, said computer storage medium comprising:

code for determining an amount of a medium exhausted into said intake manifold from a previous cylinder event of said engine;

code for adjusting fuel injected for a later cylinder event based on said determined amount of medium; and code for adjusting spark timing for said later cylinder event based on said determined amount of medium.

2. The system of claim 1 wherein said medium is air.

3. The system of claim 1 wherein said medium is fuel.

4. The system of claim 1 wherein said medium is burnt residual gas.

5. The system of claim 1 wherein said medium is an air-fuel mixture.

6. The system of claim 1 wherein said previous cylinder event occurred when the engine operated in at least a first mode with intake valve closing before bottom dead center, and said later cylinder event occurred when the engine operated in a second mode with intake valve closing after bottom dead center.

7. The system of claim 6 wherein said engine operates with an air-fuel ratio oscillating about stoichiometry.

8. The system of claim 7 further comprising a three-way catalyst.

9. The system of claim 8 further comprising an oxygen sensor.

10. The system of claim 9 further comprising code for further adjusting said injected fuel based on said oxygen sensor.

11. The system of claim 1 further comprising:
code for adjusting air inducted for a later cylinder event based on said determined amount of medium.

12. An electronically controlled system, comprising:
a computer storage medium having a computer program encoded therein for controlling fuel injected into an internal combustion engine having an intake manifold, the engine operating in at least a first and second mode, said first mode including operating with intake valve closing before bottom dead center and said second mode including operating with intake valve closing after bottom dead center, said computer storage medium comprising:
code for determining an amount of a medium exhausted into said intake manifold from a previous cylinder event of said engine occurring during said first mode;
code for adjusting fuel injected for a later cylinder event occurring during said second mode based on said determined amount of medium and
code for adjusting spark timing for said later cylinder event occurring during said second mode based on said determined amount of medium.

13. The system of claim 12 wherein said medium is air.

14. The system of claim 12 wherein said medium is fuel.

15. The system of claim 12 wherein said medium an air-fuel mixture.

16. The system of claim 12 further comprising:
code for adjusting air inducted for a later cylinder event based on said determined amount of medium.

17. A method for controlling an engine having an intake manifold and adjustable intake valve closing timing, the method comprising:
adjusting valve closing timing; and
adjusting fuel injection to and spark timing of a subsequent cylinder during said adjusting to compensate for a change in an amount of air and fuel pushed into the intake manifold from a previous cylinder, said fuel adjustment maintaining air-fuel ratio at a desired level.

18. The method of claim 17 further comprising adjust intake valve timing and exhaust valve timing equally.

19. The method of claim 17 wherein said valve closing timing is adjusted in response to a timer request.

20. An electronically controlled system, comprising:
an actuator for adjusting valve timing;
a controller having a computer storage medium with a computer program encoded therein for adjusting fuel injected into an internal combustion engine with a manifold, said medium comprising:
code for determining valve timing;
code for determining an amount of a medium exhausted into said intake manifold based on said determined valve timing;
code for adjusting fuel injected into the engine based on said determined amount of medium; and
code for adjusting spark timing based on said determined amount of medium.

21. The system of claim 20, wherein said actuator adjusts cam timing of a cam thereby adjusting valve timing.

22. The system of claim 21 wherein said cam adjusts intake valve closing timing.

23. The system of claim 20 wherein said actuator adjusts both intake valve timing and exhaust valve timing equally.

24. The system of claim 20 further comprising code for sending a signal to said actuator to change said valve timing.

25. The system of claim 20 wherein said code for adjusting fuel injected into the engine further includes code for adjusting fuel injected into the engine based on said determined amount of medium and an amount of fuel injected into the intake manifold but not inducted into the engine during a previous injection event.

26. The system of claim 20 further comprising code for determining said amount of medium exhausted into said intake manifold based on an estimated cylinder volume at intake valve closing.

27. An electronically controlled system, comprising:
an actuator for adjusting intake valve closing timing;
a controller having a computer storage medium with a computer program encoded therein for adjusting fuel injected into an internal combustion engine with a manifold, said medium comprising:
code for determining valve timing;
code for determining an amount of a gas medium exhausted into said intake manifold based on said determined valve timing and an amount of dilution in the cylinder;
code for adjusting fuel injected into the engine based on said determined amount of medium; and
code for adjusting spark timing based on said amount of dilution.

* * * * *